(12) United States Patent
Wang et al.

(10) Patent No.: US 11,323,174 B2
(45) Date of Patent: May 3, 2022

(54) PAGING FOR NON-TERRESTRIAL NETWORKS

(71) Applicant: QUALCOMM Incorporated, San Diego, CA (US)

(72) Inventors: Xiao Feng Wang, San Diego, CA (US); Jun Ma, San Diego, CA (US); Huilin Xu, San Diego, CA (US); Iyab Issam Sakhnini, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/909,793

(22) Filed: Jun. 23, 2020

(65) Prior Publication Data

US 2020/0412443 A1 Dec. 31, 2020

Related U.S. Application Data

(60) Provisional application No. 62/867,215, filed on Jun. 26, 2019.

(51) Int. Cl.
*H04W 64/00* (2009.01)
*H04B 7/185* (2006.01)
*H04B 7/204* (2006.01)
*H04W 68/00* (2009.01)

(52) U.S. Cl.
CPC ..... *H04B 7/18556* (2013.01); *H04B 7/18517* (2013.01); *H04B 7/2041* (2013.01); *H04W 64/00* (2013.01); *H04W 68/005* (2013.01)

(58) Field of Classification Search
CPC ............ H04B 7/18556; H04B 7/18517; H04B 7/2041; H04B 7/1853; H04W 64/00; H04W 68/005; H04W 68/02; H04W 4/70; H04W 60/04; H04W 4/029; H04W 8/06
See application file for complete search history.

(56) References Cited

U.S. PATENT DOCUMENTS

| | | | |
|---|---|---|---|
| 2013/0028184 A1* | 1/2013 | Lee | H04W 48/02 370/328 |
| 2018/0007699 A1* | 1/2018 | Ishii | H04W 16/12 |

OTHER PUBLICATIONS

ZTE, Tracking Area Management and Paging Handling in NTN, Feb. 2019, 3GPP Draft; R3-190139, 3GPP,, Athens, Greece). (Year: 2019).*

(Continued)

*Primary Examiner* — Said M Elnoubi
(74) *Attorney, Agent, or Firm* — Muncy, Geissler, Olds & Lowe, P.C.

(57) ABSTRACT

Disclosed are techniques for paging a user terminal (UT) in a non-terrestrial network (NTN), which may define a plurality of NTN tracking areas (TA). Each NTN TA, served by one or more satellite beams, may move or may be a geographic region. The UT may report its location before changing its connection state with the NTN and may also update its location whenever it moves a threshold distance from the previous reported location. The NTN may estimate UT's current location based on the last reported location and other factors including mobility of the UT. The NTN may determine a UT TA as the NTN TA that corresponds to the current location, and may page the UT through one or more satellite beams corresponding to the UT TA.

30 Claims, 16 Drawing Sheets

(56) References Cited

OTHER PUBLICATIONS

"3rd Generation Partnership Project; Technical Specification Group Radio Access Network; Solutions for NR to Support Non-Terrestrial Networks (NTN) (Release16)", 3GPP Standard, Technical Report; 3GPP TR 38.821, 3rd Generation Partnership Project (3GPP), Mobile Competence Centre, 650, Route Des Lucioles ; F-06921 Sophia-Antipolis Cedex, France, No. V0.7.0, Jun. 13, 2019 (Jun. 13, 2019), pp. 1-86, XP051754097, [retrieved on Jun. 13, 2019] Chapters 7.3.1, 8.1, 8.2.
Hughes: "NR-NTN: Paging in NGSO Satellite Systems", 3GPP Draft, R1-1803507, 3GPP TSG RAN1 Meeting #92, 3rd Generation Partnership Project (3GPP), Mobile Competence Centre, 650, Route Des Lucioles, F-06921 Sophia-Antipolis Cedex, France vol. RAN WG1, no. Athens, Greece, Mar. 26, 2018-Mar. 2, 2018, Mar. 5, 2018 (Mar. 5, 2018), XP051398804, pp. 1-8, Retrieved from the Internet: URL: http://www.3gpp.org/ftp/tsg%5Fran/WG1%5FRL1/TSGR1%5F92/DocsZ [retrieved on Mar. 5, 2018] Chapter 2.
Hughes: "NR-NTN: Paging in NGSO Satellite Systems", 3GPP Draft, R3-184403, 3GPP TSG RAN WG3 Meeting #101, 3rd Generation Partnership Project (3GPP), Mobile Competence Centre, 650, Route Des Lucioles, F-06921 Bophia-Antipolis Cedex, France, vol. RAN WG3, no. Gothernburg, Sweden; Aug. 20, 2018- Aug. 24, 2018, Aug. 10, 2018 (Aug. 10, 2018), 5 Pages, XP051527768, Retrieved from the Internet: URL: http://www.3gpp.org/ftp/tsg%5Fran/WG3%5Flu/TSGR3%5F101/Docs/R3%2D184403%2Ezip [retrieved on Aug. 10, 2018] Chapters 2, 3.
International Search Report and Written Opinion—PCT/US2020/039322—ISA/EPO—dated Sep. 1, 2020.
Nokia., et al., "tracking Area considerations for NTN", 3GPP Drart; R2-1817606, 3GPP TSG-RAN WG2 Meeting #104, Tracking Area Considerations for NTN, 3rd Generation Partnership Project (3GPP), Mobile Competence Centre, 650, Route Des Lucioles, F-06921 Sophia-Antipolis Cedex, France, vol. RAN WG2, no. Spokane, USA, Nov. 12, 2018-Nov. 16, 2018, Nov. 12, 2018 (Nov. 12, 2018), XP051557131, 2 Pages, Retrieved from the Internet: URL: http://www.3gpp.org/ftp/Meetings%5F3GPP%5FSYNC/RAN2/Docs/R2%2D1817606%2Ezip [retrieved on Nov. 12, 2018].
Zte., et al., "Tracking Area Management and Paging Handling in NTN", 3GPP Draft, R3-190139, 3GPP TSG RAN WG3#103, Tracking Area Management and Paging Handling in NTN V5, 3rd Generation Partnership Project (3GPP), Mobile Competence Centre, 650, Route Des Lucioles, F-06921 Sophia-Antipolis C, vol. RAN WG3, no. Athens, Greece; Feb. 25, 2019-Mar. 1, 2019, Feb. 16, 2019 (Feb. 16, 2019), 13 Pages, XP051604086, Retrieved from the Internet: URL: http://www.3gpp.org/ftp/tsg%5Fran/WG3%5Flu/TSGR3%5F103/Docs/R3%2D190139%2Ezip [retrieved on Nov. 12, 2018].

* cited by examiner

PAGING FOR NON-TERRESTRIAL NETWORKS

CROSS-REFERENCE TO RELATED APPLICATION

The present application for patent claims the benefit of U.S. Provisional Patent Application No. 62/867,215 entitled "PAGING FOR NON-TERRESTRIAL NETWORKS," filed Jun. 26, 2019, assigned to the assignee hereof, and expressly incorporated herein by reference in its entirety.

INTRODUCTION

Various aspects described herein generally relate to wireless networks, and in particular, are directed to paging in non-terrestrial networks (NTN).

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. It is desirable to support several hundreds of thousands of simultaneous connections in order to support large sensor deployments. Consequently, one aim is to significantly enhance the spectral efficiency of 5G mobile communications. Another aim is to enhance signaling efficiencies and substantially reduce latency.

Paging is a feature that is available in most, if not all, wireless communication systems. It is desirable to ensure that the targeted user equipment (UE) can be paged anytime and anywhere with minimum delay. To enable paging of a UE, the network can have some knowledge of estimate of the UE's current location, even if the UE is not actively connected to the network. For terrestrial networks, existing techniques use tracking areas (TA) to define a paging region within which the UE is estimated to be in, and paging messages are sent from the base stations (e.g., eNB, gNB) within the TA. However, for satellite-based networks such as networks of low earth orbit (LEO) and/or middle earth orbit (MEO) satellites, the existing techniques may be insufficient since such satellites are constantly moving in relation with earth's surface.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An aspect is direct to a method performed by a network node of a non-terrestrial network (NTN) is disclosed. The method may comprise determining a last area of a user terminal (UT). The method may also comprise determining a UT tracking area (TA) based on the last area. The UT TA may be a non-terrestrial network tracking area (NTN TA) in which the UT is currently located. The UT TA may be one of a plurality of NTN TAs. The method may further comprise paging the UT using one or more satellite beams corresponding to the UT TA.

Another aspect is directed to a network node of a non-terrestrial network (NTN) is disclosed. The network node may comprise a memory and at least one processor coupled to the memory. The memory and the at least one processor may be configured to determine a last area of a user terminal (UT). The memory and the at least one processor may also be configured to determine a UT tracking area (TA) based on the last area. The UT TA may be a non-terrestrial network tracking area (NTN TA) in which the UT is currently located. The UT TA may be one of a plurality of NTN TAs. The memory and the at least one processor may further be configured to page the UT using one or more satellite beams corresponding to the UT TA.

Another exemplary network node of a non-terrestrial network (NTN) is disclosed. The network node may comprise means for determining a last area of a user terminal (UT). The network node may also comprise means for determining a UT tracking area (TA) based on the last area. The UT TA may be a non-terrestrial network tracking area (NTN TA) in which the UT is currently located. The UT TA may be one of a plurality of NTN TAs. The network node may further comprise means for paging the UT using one or more satellite beams corresponding to the UT TA.

An exemplary non-transitory computer-readable medium storing computer-executable instructions for a network node of a non-terrestrial network (NTN) is disclosed. The computer-executable instructions may comprise one or more instructions causing the network node to determine a last area of a user terminal (UT). The computer-executable instructions may also comprise one or more instructions causing the network node to determine a UT tracking area (TA) based on the last area. The UT TA may be a non-terrestrial network tracking area (NTN TA) in which the UT is currently located. The UT TA may be one of a plurality of NTN TAs. The computer-executable instructions may further comprise one or more instructions causing the network node to page the UT using one or more satellite beams corresponding to the UT TA.

An exemplary method performed by a user terminal (UT) is disclosed. The method may comprise changing a connection state of the UT with a non-terrestrial network (NTN). The method may also comprise receiving a paging message from the NTN subsequent to changing the connection state.

An exemplary user terminal (UT) is disclosed. The UT may comprise a memory and at least one processor coupled to the memory. The memory and the at least one processor may be configured to change a connection state of the UT with a non-terrestrial network (NTN). The memory and the at least one processor may also be configured to receive a paging message from the NTN subsequent to changing the connection state.

Another exemplary user terminal (UT) is disclosed. The UT may comprise means for changing a connection state of the UT with a non-terrestrial network (NTN). The UT may also comprise means for receiving a paging message from the NTN subsequent to changing the connection state.

An exemplary non-transitory computer-readable medium storing computer-executable instructions for a user terminal (UT) is disclosed. The computer-executable instructions may comprise one or more instructions causing the UT to change a connection state of the UT with a non-terrestrial network (NTN). The computer-executable instructions may also comprise one or more instructions causing the UT to receive a paging message from the NTN subsequent to changing the connection state.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof:

FIGS. 4A-1 and 4A-2 illustrate an example of a non-terrestrial network tracking area that move relative to earth surface, according to various aspects;

FIGS. 4B-1 and 4B-2 illustrate an example of a non-terrestrial network tracking area that is geographically bound, according to various aspects;

DETAILED DESCRIPTION

Figure 1:
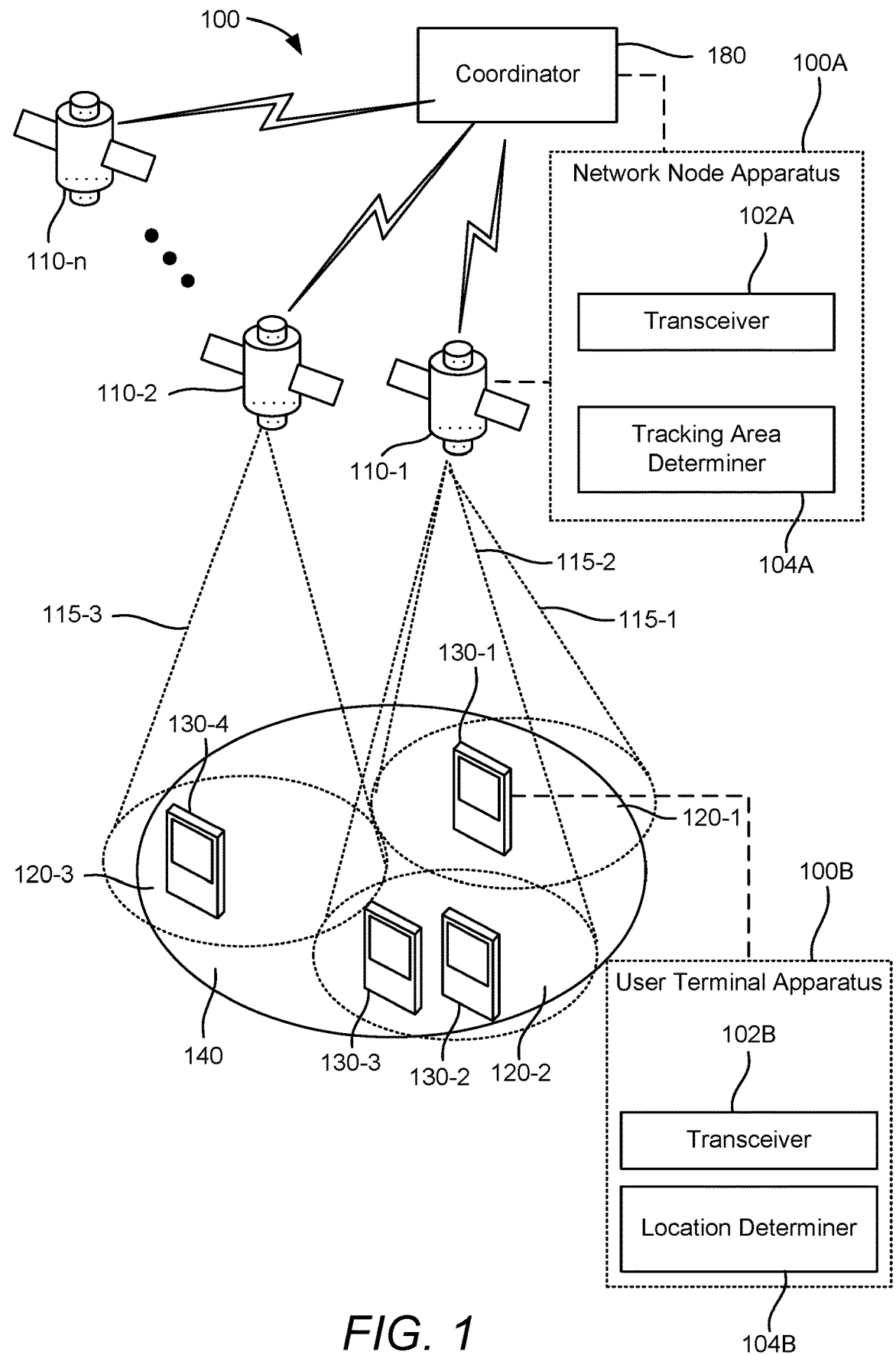
FIG. 1 illustrates an exemplary non-terrestrial network serving user terminals, according to various aspects.

Various aspects described herein generally relate to paging in non-terrestrial networks (NTN). Examples of NTNs include networks based on satellites, balloons, aircrafts, unmanned aerial vehicles, etc., which may be categorized into high altitude platform station (HAPS) and satellites. A satellite-based NTN may comprise one or more low earth orbit (LEO) and/or one or more medium earth orbit (MEO) satellites. In terrestrial networks (e.g., 5G NR, LTE, etc.), there do exist techniques to define a paging region within which the UE is estimated to be located. In a terrestrial network, tracking areas (TA) are used to define the paging region. Each TA includes a number of cells (e.g., eNBs, gNBs, etc.). The TA information is broadcasted to all UEs in a cell. When the UE crosses a TA boundary, the UE notifies the terrestrial network.

However, for NTNs (e.g., LEO and/or MEO satellite networks, HAPS), the existing techniques for terrestrial networks need to be improved. This is because the NTN stations (e.g., satellites, planes, balloons) constantly move in relation to the earth's surface. This means that in addition to the motion of the UT, it may be desirable to also take into consideration the motion of the NTN stations for paging.

To address the issues discussed above, one or more techniques are proposed to enable paging of UTs using non-terrestrial networks (NTN). In one aspect, when the UT is to be paged, the UT's current location or area may be determined. For example, the UT's current location or area may be estimated based on the UT's last location/area and other factors such as UT's mobility. Once the UT's current location/area is estimated or otherwise determined, the UT may be paged using one or more satellite beams that are serving the UT's estimated current location/area.

These and other aspects are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE), "user terminal" (UT), and "base station" are not intended to be specific or otherwise limited to any particular Radio Access Technology (RAT), unless otherwise noted. In general, such UEs, interchangeable with UTs, may be any wireless communication device (e.g., a mobile phone, router, tablet computer, laptop computer, tracking device, Internet of Things (IoT) device, etc.) used by a user to communicate over a wireless communications network. A UE/UT may be mobile or may (e.g., at certain times) be stationary, and may communicate with a Radio Access Network (RAN). As used herein, the interchangeable terms "UE" and "UT", may also be referred to interchangeably as an "access terminal" or "AT," a "client device," a "wireless device," a "subscriber device," a "subscriber terminal," a "subscriber station," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

The term "UE" is typically used in context of terrestrial networks and the term "UT" is typically used in context of satellite-based networks. But as indicated above, these terms may be interchangeably used in the description below.

As mentioned above, in paging, it is desirable to ensure that the targeted client device (e.g., UT, UE) can be paged anytime and anywhere with minimum delay. In the context of paging in non-terrestrial networks (NTN), the initial paging should not fail due to not paging the UT from the correct station or station beam (when multiple beams are transmitted by a station of the NTN). It is also desirable to minimize use of system resources. That is, it is undesirable to send paging to the UT over a very large region, i.e., through many station beams. If the network has knowledge of or can estimate the UT's location, both objectives may be achieved.

FIG. 1 illustrates an example of a NTN 100 serving UTs 130. Before proceeding further, the following should be noted. In FIG. 1 and in other figures, a satellite-based NTN will be described. However, the described concepts are readily applicable to other NTNs. For example, satellites 110 may be generalized as being examples of stations, and satellite beams 115 (described below) may be generalized as being examples of station beams.

In FIG. 1, the NTN 100 may include one or more satellites 110-1, 110-2, . . . 110-*n* (collectively satellites 110). Each satellite 110 may be a LEO or a MEO satellite. It other words, each satellite 110 may move in relation to earth surface. The satellites 110 may communicate with UTs 130 using satellite beams 115, which are communication beams of the satellites 110. More generically, the stations 110 may communicate with UTs 130 using station beams 115. Each satellite 110 may communicate the UTs 130 using one or more satellite beams 115. For example, in FIG. 1, satellite 110-1 is illustrated as using two satellite beams 115-1, 115-2 to serve the UTs 130, and satellite 110-2 is illustrated as using one satellite beams 115-3 to serve the UTs 130. The satellite beams of other satellites are not illustrated so as to reduce clutter.

Each satellite beam 115 may cover a coverage area 120, and a satellite 110 may serve the UTs 130 within the coverage area 120 through that satellite beam 115. For example, in FIG. 1, the satellite beams 115-1, 115-2, 115-3 respectively cover coverage areas 120-1, 120-2, 120-3. This means that satellite 110-1 may serve UT 130-1 in coverage area 120-1 through satellite beam 115-1 and serve UTs 130-2, 130-3 in coverage area 120-2 through satellite beam 115-2. Also, satellite 110-2 may serve UT 130-4 in coverage area 120-3 through satellite beam 115-3. In an aspect, each satellite 110 may be identifiable (e.g., through a satellite ID), each satellite beam 115 may be identifiable (e.g., beam ID), and each satellite beam 115 may be associated with a particular satellite (e.g., mapping of each beam ID to a satellite ID).

It may be said each satellite beam 115 may serve any UTs 130 in the coverage area 120 of that satellite beam 115. It is of course recognized that it is the satellite 110 that actually serves the UT 130. However, when each satellite beam 115 is associated with a particular satellite 110, stating that a satellite beam 115 serves a UT 130 should not cause any confusion since the satellite 110 associated with a particular satellite beam 115 may be readily identified.

In FIG. 1, a non-terrestrial network tracking area (NTN TA) 140 is illustrated. In this instance, the NTN TA 140 is covered by the coverage areas 120-1, 120-2, 120-3 of the satellite beams 115-1, 115-2, 115-3. While only one NTN TA 140 is shown, it should be recognized that a plurality of NTN TAs 140 may be defined in the NTN 100. Also, the UTs 130 within each NTN TA 140 may be served by one or more satellites 110. That is to say, each NTN TA 140 may be covered by one or more coverage areas 120 of one or more satellite beams 115 of the one or more satellites 110. Note that it is not necessary for the number of satellites 110 and the number of satellite beams 115 be equal for an NTN TA 140. This is because there can be at least one satellite 110 that corresponds to at least two satellite beams 115.

The NTN may also include a coordinator 180 in communication with the satellites 110. The coordinator 180 may be configured to coordinate actions of the satellites 110. For example, the coordinator 180 may coordinate a handoff of a UT 130 between two satellites 110 and/or between two satellite beams 115. As another example, the coordinator 180 may serve as a gateway for a UT 130 to communicate with terminals of other communication systems such as terrestrial networks (e.g., 5G NR, LTE, PLMN, etc.).

In an aspect, the NTN 100 may be analogized to a terrestrial network. For example, satellites 110 may be analogous to base stations (e.g., eNB, gNB, etc.); satellite beams 115 and/or coverage areas 120 may be analogous to cells or sectors; and the coordinator 180 may be analogous to a core network device. In another aspect, the coordinator 180 may be analogous to gNB and satellites 110 may be analogous to repeaters.

In an alternative perspective, each satellite 110 may have one or more cells, and each cell may have one or more beams 115 corresponding to one or more coverage areas 120. As a result, each satellite 110 may correspond to one or more cells and/or one or more satellite beams 115 and/or one or more coverage areas 120.

Further illustrated in FIG. 1 is an example network node apparatus 100A and a user terminal apparatus 100B. The network node apparatus 100A may include at least a transceiver 102A and a tracking area determiner 104A, and the user terminal (UT) apparatus 100B may include at least a transceiver 102B, and a location determiner 104B. As will be described in more detail below, the tracking area determiner 104A (e.g., which may be implemented as a processing function via a processor on the network node apparatus 100A) may execute logic so as to determine user terminal tracking areas (UT TA). Also, the location determiner 104B (e.g., which may be implemented as a processing function via a processor on the UT apparatus 100B) may execute logic so as to determine a location of the UT apparatus 100B and report the location to the network node apparatus 100A. The network node apparatus 100A and the UT apparatus 100B are intended to be representative of various exemplary network nodes and UTs may carry out certain aspects of the present disclosure. Accordingly, the network node apparatus 100A and the UT apparatus 100B appear in certain FIGS below to emphasize the configurations of various network nodes and the UTs. Moreover, the network node apparatus 1300 of FIG. 15 and the UT apparatus 1400 of FIG. 16 illustrate more detailed implementation examples of the network node apparatus 100A and the UT apparatus 100B in accordance with various aspects.

Figure 2:
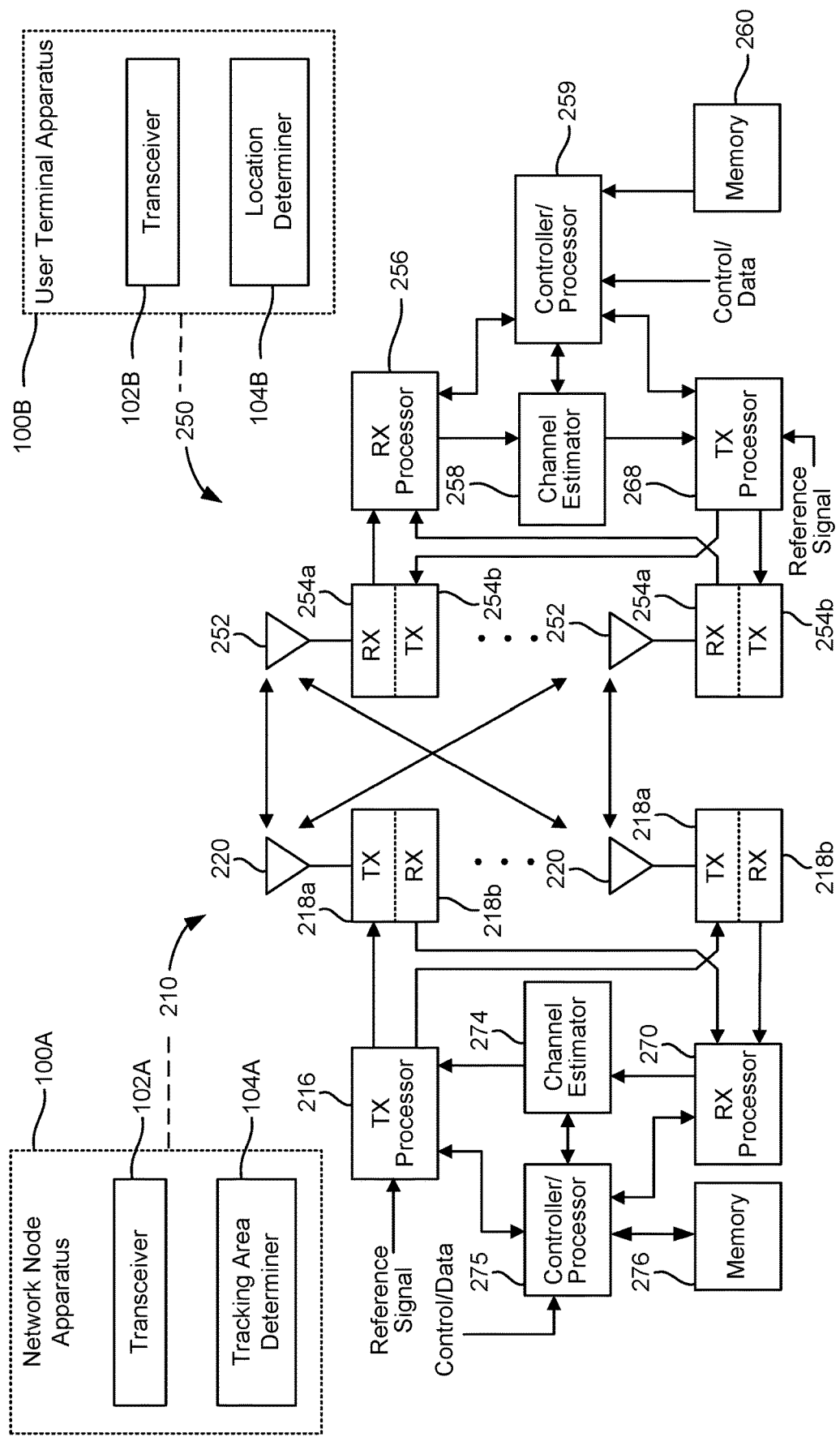
FIG. 2 illustrates an exemplary paging transmitter in communication with an exemplary paging receiver, according to various aspects.

According to various aspects, FIG. 2 illustrates an exemplary paging transmitter 210 (e.g., satellite) in communication with an exemplary paging receiver 250 (e.g., user terminal). Internet Protocol (IP) packets may be provided to a controller/processor 275. The controller/processor 275 may implement functionality for a radio resource control (RRC) layer, a packet data convergence protocol (PDCP) layer, a radio link control (RLC) layer, and a medium access control (MAC) layer. The controller/processor 275 may provide RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for paging receiver measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 216 and the receive (RX) processor 270 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and multiple-input and multiple-output (MIMO) antenna processing. The TX processor 216 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the paging receiver 250. Each spatial stream may then be provided to one or more different antennas 220 via a separate transmitter 218a. Each transmitter 218a may modulate an RF carrier with a respective spatial stream for transmission.

At the paging receiver 250, each receiver 254a may receive a signal through its respective antenna 252. Each receiver 254a may recover information modulated onto an RF carrier and may provide the information to the RX processor 256. The TX processor 268 and the RX processor 256 may implement Layer-1 functionality associated with various signal processing functions. The RX processor 256 may perform spatial processing on the information to recover any spatial streams destined for the paging receiver 250. If multiple spatial streams are destined for the paging receiver 250, they may be combined by the RX processor 256 into a single OFDM symbol stream. The RX processor 256 may then convert the OFDM symbol stream from the time-domain to the frequency domain using a Fast Fourier Transform (FFT). The frequency domain signal may comprise a separate OFDM symbol stream for each subcarrier of the OFDM signal. The symbols on each subcarrier, and the reference signal, may be recovered and demodulated by determining the most likely signal constellation points transmitted by the paging transmitter 210. These soft decisions may be based on channel estimates computed by the channel estimator 258. The soft decisions may then decoded and de-interleaved to recover the data and control signals that were originally transmitted by the paging transmitter 210 on the physical channel. The data and control signals may then be provided to the controller/processor 259, which implements Layer-3 and Layer-2 functionality.

The controller/processor 259 can be associated with a memory 260 that stores program codes and data. The memory 260 may be referred to as a computer-readable medium. In the UL, the controller/processor 259 may provide demultiplexing between transport and logical channels, packet reassembly, deciphering, header decompression, and control signal processing to recover IP packets from the core network. The controller/processor 259 may also be responsible for error detection.

Similar to the functionality described in connection with the T2R transmission by the paging transmitter 210, the controller/processor 259 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 258 from a reference signal or feedback transmitted by the paging transmitter 210 may be used by the TX processor 268 to select the appropriate coding and modulation schemes, and to facilitate spatial processing. The spatial streams generated by the TX processor 268 may be provided to different antenna 252 via separate transmitters 254b. Each transmitter 254b may modulate an RF carrier with a respective spatial stream for transmission.

The UL transmission may be processed at the paging transmitter 210 in a manner similar to that described in connection with the receiver function at the paging receiver 250. Each receiver 218b may receive a signal through its respective antenna 220. Each receiver 218b may recover information modulated onto an RF carrier and may provide the information to a RX processor 270.

The controller/processor 275 can be associated with a memory 276 that stores program codes and data. The memory 276 may be referred to as a computer-readable medium. In the UL, the controller/processor 275 may provide demultiplexing between transport and logical channels, packet reassembly, deciphering, header decompression, control signal processing to recover IP packets from the paging receiver 250. IP packets from the controller/processor 275 may be provided to the core network. The controller/processor 275 may also be responsible for error detection.

In the paging receiver 250, the transmitter 254b and the receiver 254a may together form a transceiver 254. In the paging transmitter 210, the transmitter 218a and the receiver 218b may together form a transceiver 218.

The paging transmitter 210 and the paging receiver 250 may be configured to implement the proposed preamble format allocation approach. In this approach, the paging transmitter (e.g., gNB, cell) may allocate a plurality of PRACH preamble formats and transmit or broadcast the allocated preamble formats in one or more SSBs. The SSBs may be periodically broadcasted. The paging receiver (e.g., UT) may receive the allocated preamble formats in the one or more SSBs. To perform initial access, the UT may choose a preamble format from among the plurality of allocated preamble formats based on one or more metrics (e.g., RSRP, SNR, SINR, BER, etc.), and transmit the preamble accordingly.

Figure 3:
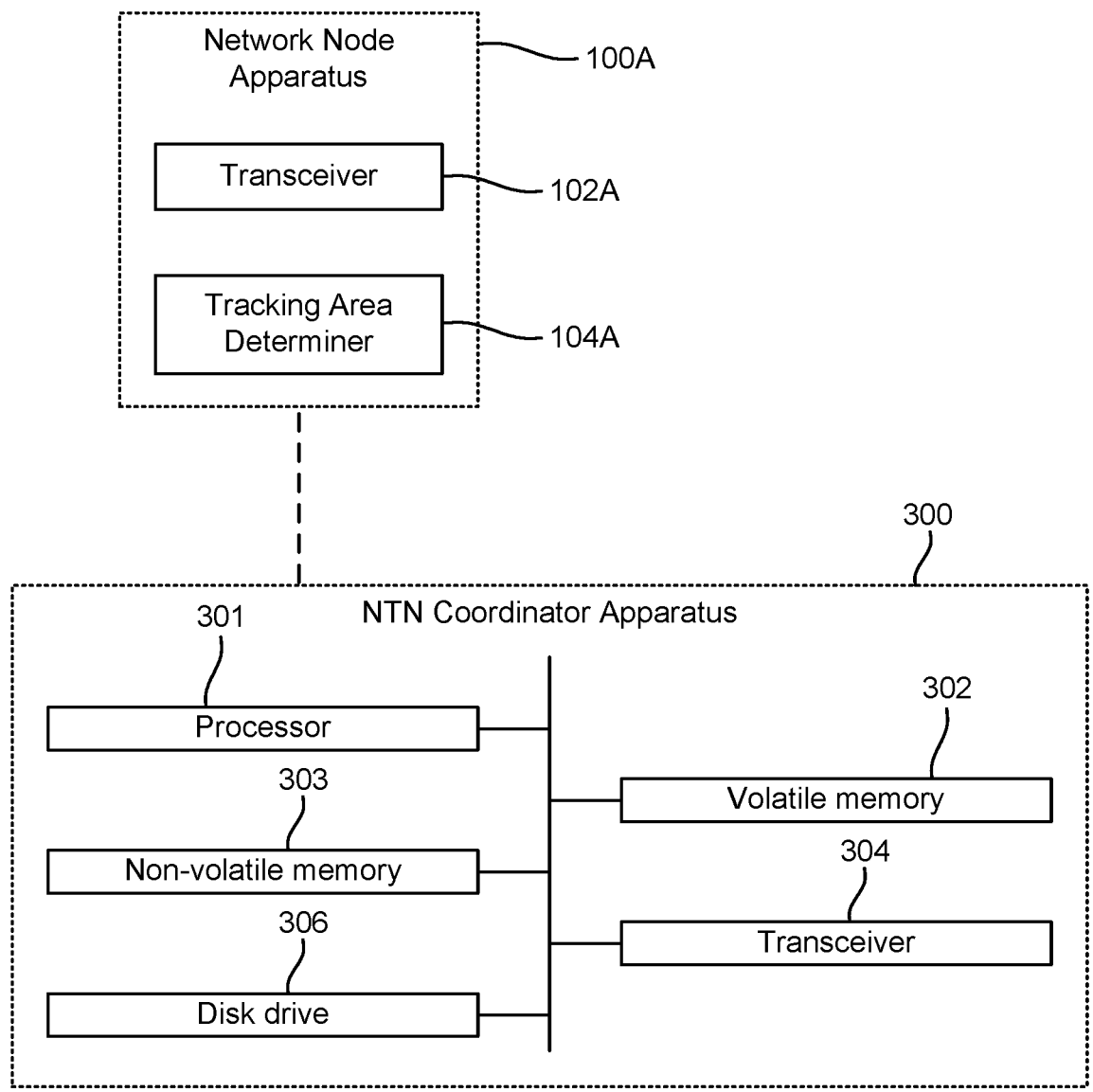
FIG. 3 illustrates an exemplary non-terrestrial network node according to various aspects.

FIG. 3 illustrates an exemplary NTN coordinator 300 (e.g., coordinator 180). The coordinator 300 may include one or more processors 301 coupled to volatile memory 302 and a large capacity nonvolatile memory 303, such as a disk drive. The coordinator 300 may include a floppy disc drive, compact disc (CD) or DVD disc drive 306 also coupled to the processor 301. The processor 301 can be associated with any or all of the memories 302, 303, 306 that store that store program codes and data. Any or all of the memories 302, 303, 306 may be referred to as computer-readable mediums. The coordinator 300 may include communication ports or transceivers 304 coupled to the processor 301 for establishing communication with satellites 110, and with the UTs 130 through the satellites 110.

Referring back to FIG. 1, the concept of tracking areas—the NTN TA 140—may be used for paging in the NTN 100. However, the NTN TAs 140 are different from the tracking areas of terrestrial networks. Recall that in terrestrial networks, each tracking area is associated with a number of base stations. Since the locations of base stations in terrestrial networks are typically fixed, this means that each terrestrial tracking area is geographically bound and associated with the base stations at the same time.

However, in satellite-based networks such as the network 100, both cannot occur at the same time. That is, the NTN TA 140 may be associated with a group of one or more satellite beams 115 (more generally, group of one or more station beams). However, since the one or more satellites 110 corresponding to the satellite beams 115 move in relation to the earth surface, the associated NTN TA 140 also moves relative to the earth surface.

Figures 1, 4A:
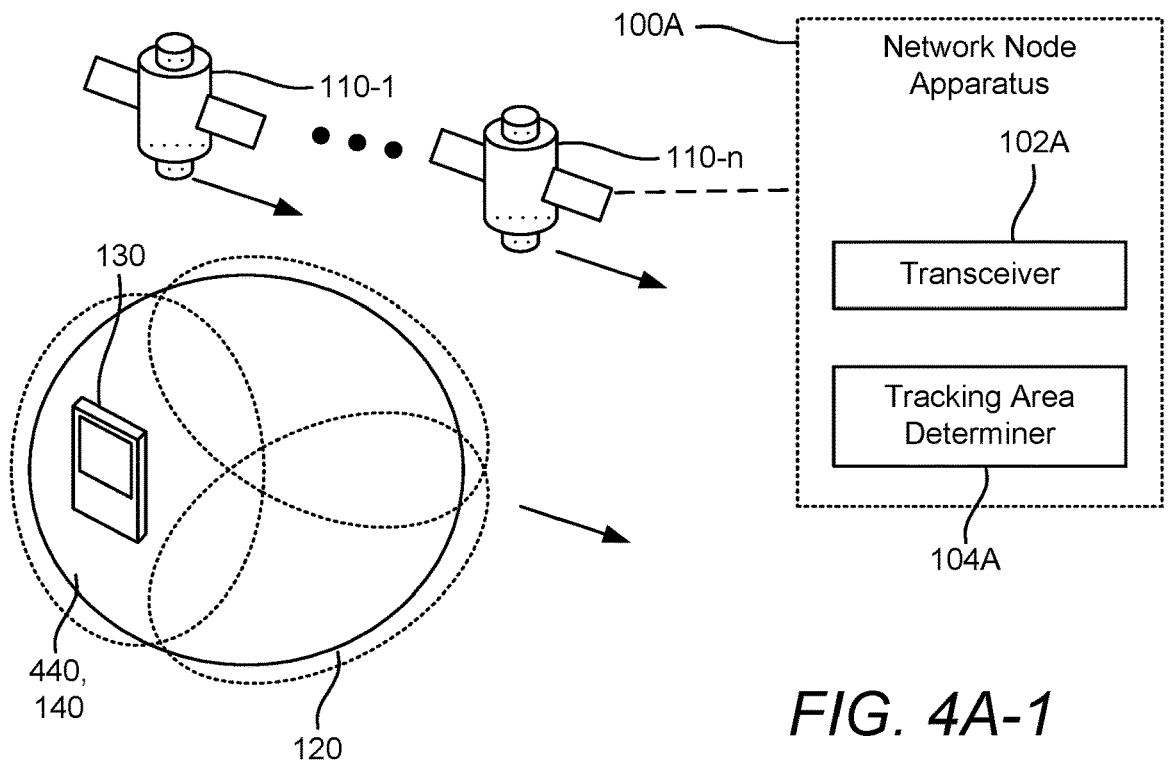
Figures 2, 4A:
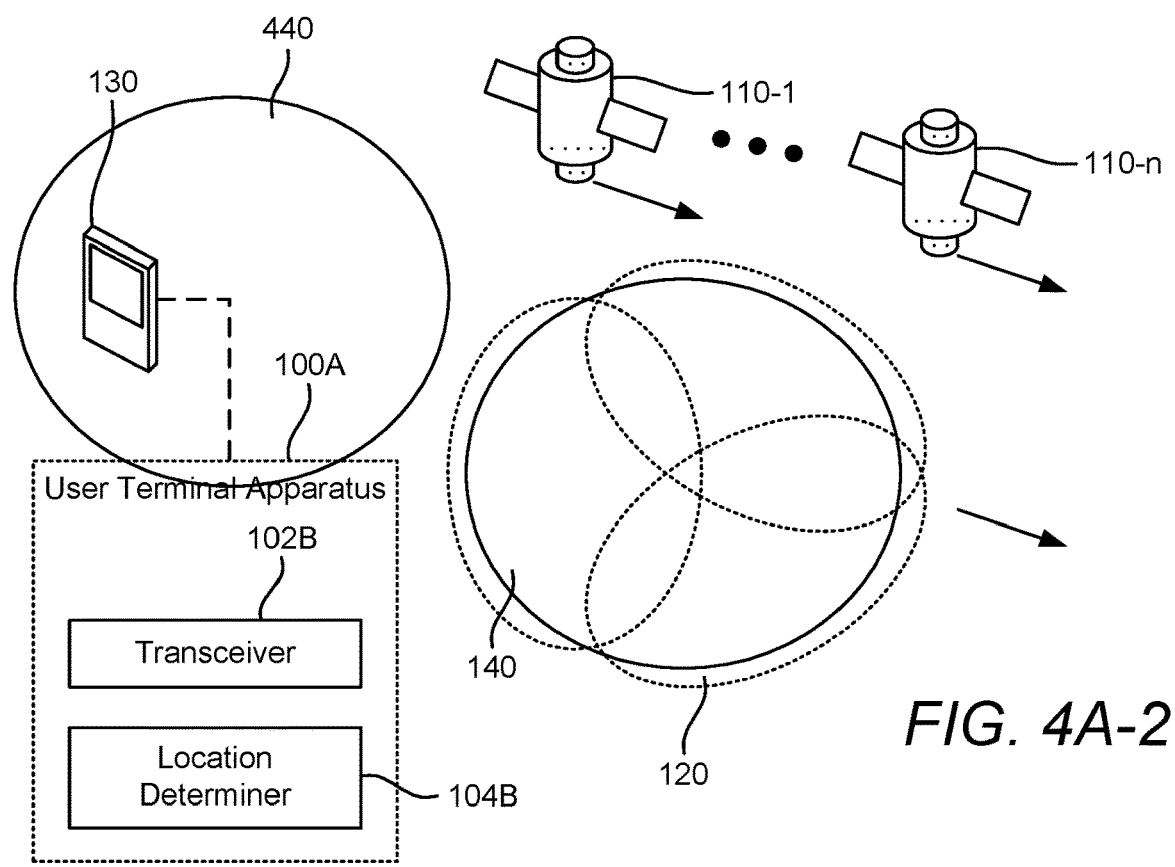

This is illustrated in FIGS. 4A-1 and 4A-2. In FIGS. 4A-1 and 4A-2, it may be assumed that the NTN TA 140, which is one of a number of NTN TAs defined in the network 100, is covered by one or more coverage areas 120 of one or more satellite beams 115 (not shown so as to reduce clutter) of one or more satellites (e.g., satellites 110-1 . . . 110-n). It may also be assumed that the NTN TA 140 is associated with the satellites 110-1 . . . 110-n. Note that the UT 130 is within the NTN TA 140 in FIG. 4A-1. The NTN TA 140 is also labeled as UT TA 440. That is, UT TA 440 is the NTN TA 140 within which the UT 130 is currently located.

Since the NTN TA 140 is associated with the satellites 110-1 . . . 110-n that move relative to earth surface, the NTN TA 140 also moves relative to earth surface as shown in FIG. 4A-2. When the satellites 110-1 . . . 110-n move far enough so that the coverage areas 120 of the satellites 110-1 . . . 110-n do not cover the UT 130, the NTN TA 140 is no longer a UT TA 440. This means that it is possible for the UT 130 to cross the TA boundary even if the UT 130 itself does not move or moves very little. In an aspect, the UT 130 may report crossing of the NTN TA boundary.

Figures 1, 4B:
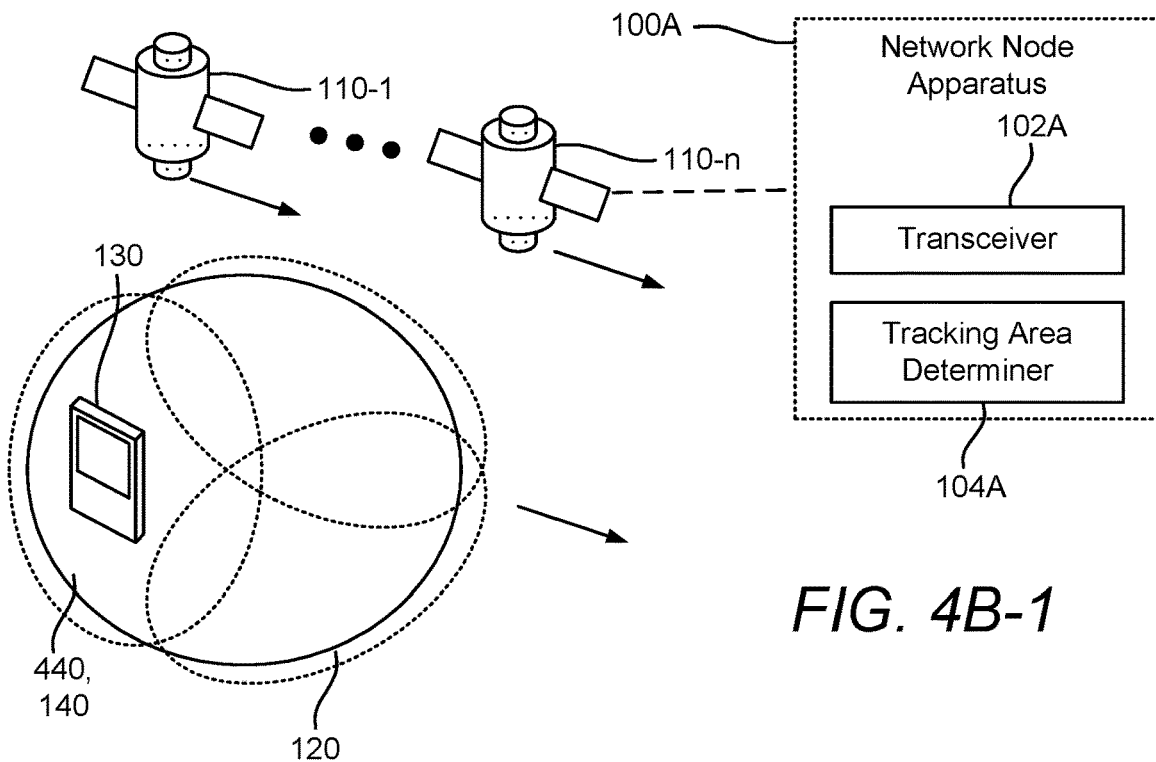
Figures 2, 4B:
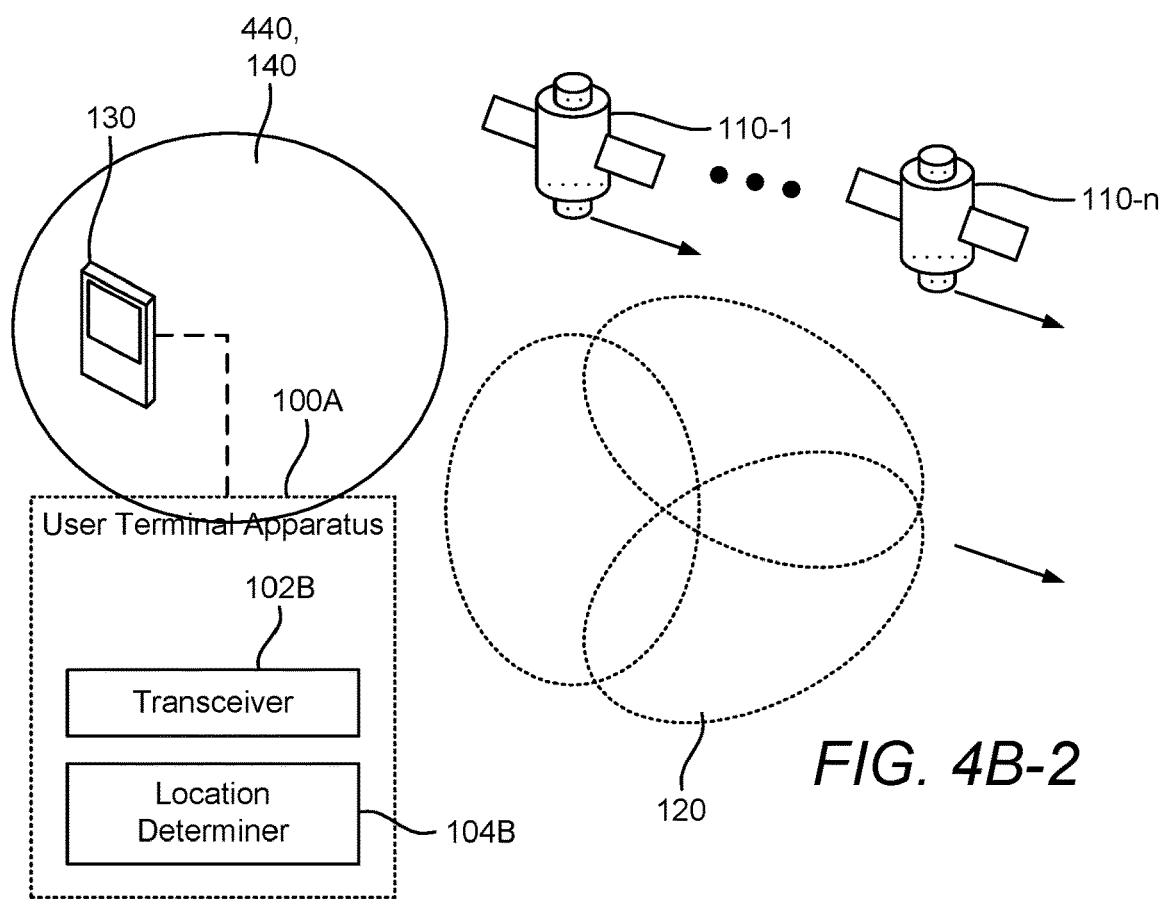

Alternatively, the NTN TA 140 may be a geographical zone on earth surface. However, since the satellites 110 of the network 100 move in relation to the earth surface, the NTN TA 140 may be covered by different coverage areas 120 at different times. This is illustrated in FIGS. 4B-1 and 4B-2. In FIGS. 4B-1 and 4B-2, it may be assumed that the NTN TA 140, which is one of a number of NTN TAs defined in the network 100, is a geographical zone. At the particular moment of FIG. 4B-1, the NTN TA 140 is covered by one or more coverage areas 120 of one or more satellite beams 115 (not shown so as to reduce clutter) of one or more satellites (e.g., satellites 110-1 . . . 110-*n*). Since the UT 130 is within the NTN TA 140, the NTN TA 140 is also labeled as UT TA 440 in FIG. 4B1.

However, since the satellites 110-1 . . . 110-*n* move relative to earth surface, the corresponding coverage regions 120 also move. This means that the UT TA 440/NTN TA 140 may be covered by coverage areas 120 (not shown) of other satellites 110. When the satellites 110-1 . . . 110-*n* move far enough so that the coverage areas 120 of the satellites 110-1 . . . 110-*n* no longer cover any of the UT TA 440, the UT TA 440 will be covered by entirely different coverage areas 120.

For paging purposes, regardless of whether the NTN TAs 140 move (i.e., associated with groups of satellite beams 115) or are geographically fixed (i.e., define geographical zones), the UT TA 440 may be determined for a UT 130. Once the UT TA 440 is determined, then the UT 130 may be paged by using one or more satellites 115 corresponding to the UT TA 440. That is to say, the satellites 110 used to page the UT 130 may be the one or more satellites 110 corresponding to the one or more satellite beams 115 whose one or more coverage areas 120 cover the UT TA 440.

In an aspect, the UT TA 440 may be determined based on a current location of the UT 130. The current location of the UT 130 may be determined (e.g., estimated) based on a last location of the UT 130. To account for error margins in making such location determinations, the following may be said: the UT TA 440 may be determined based on a current region of the UT 130, which may be estimated based on a last area of the UT 130. The current region may encompass the current location, and the last area may encompass the last location.

The current region may depend, at least in part, on the mobility of the UT. If the mobility of the UT is low (i.e., moves slow), the distance that could have been traveled by the UT 130 since the last area was determined would be small. Thus, the current region may be relatively small since the distance from the last area accounted by the current region is relatively small.

On the other hand, if the mobility of the UT is high (i.e., moves fast), the distance that could have been traveled by the UT 130 since the last area was determined could be large. Thus, the current region may be relatively large since the distance from the last area accounted by the current region is also relatively large.

In an aspect, the UT 130 may report its mobility to the network 100, e.g., to the coordinator 180 and/or to a satellite 110. The mobility may be reported as a mobility type of a plurality of mobility types. Each mobility type may correspond to a level or a range of mobility. For example, mobility type 0 may indicate a fixed mobility, i.e., the UT's location is permanent or otherwise immovable at least while the UT is in operation. As another example, mobility type 1 may indicate a stationary mobility, i.e., the UT 130 is not moving. Difference between fixed and stationary mobility types is explained further below. As other examples, mobility type 2 indicate low mobility (e.g., walking), mobility type 3 may indicate medium mobility (e.g., cars, boats, trucks, etc.), and mobility type 4 may indicate high mobility (e.g., air planes). Of course, these are merely examples, and the granularity of mobility types can be as fine or as coarse as desired.

In an aspect, the UT 130 may report its mobility to the network 100, e.g., to the coordinator 180 and/or to a satellite 110. The mobility may be reported as a mobility type of a plurality of mobility types. Each mobility type may correspond to a level or a range of mobility. For example, mobility type 1 may indicate a stationary mobility, i.e., the UT 130 is not moving. As other examples, mobility type 2 indicate low mobility (e.g., walking), mobility type 3 may indicate medium mobility (e.g., cars, boats, trucks, etc.), and mobility type 4 may indicate high mobility (e.g., air planes).

Also, the mobility type of a UT 130 need not be remain the same, i.e., may change at different times. For example, the UT 130 may recognize its current speed and may report to the network 100 the mobility type appropriate for the current speed. For example, the UT 130 may recognize that it is moving at less than 10 mph (indicating walking speed), and may report mobility type 2. Later, if the UT 130 recognizes that it is traveling at greater than 20 mph (indicating vehicular speed), the UT 130 may update its mobility type to 3.

As indicated above, mobility types 0 and 1 both apply to circumstances in which the UT 130 is not moving. It is noted that there may be different reasons for the UT 130 to be not moving. In one instance, the UT 130 itself may be mobile (e.g., a satellite phone), i.e., is capable of being moved. But at a given moment, it may not be moving. For example, the user may have simply set the UT 130 down. Mobility type 1—stationary mobility—is intended to cover such non-moving UT scenario.

However, in another instance, the location of the UT 130 may be permanently fixed or simply "fixed". As an illustration, many satellite dishes are not expected to move once they are installed. In non-terrestrial networks, fixed satellite dishes may represent a significant portion of all UTs 130. For such a fixed UT 130, once the installed, its physical location may be stored in the NTN 100, e.g., in the coordinator 180, satellites 110, etc. Mobility type 0—fixed mobility—is intended to cover such non-moving UT scenario.

Figure 5:
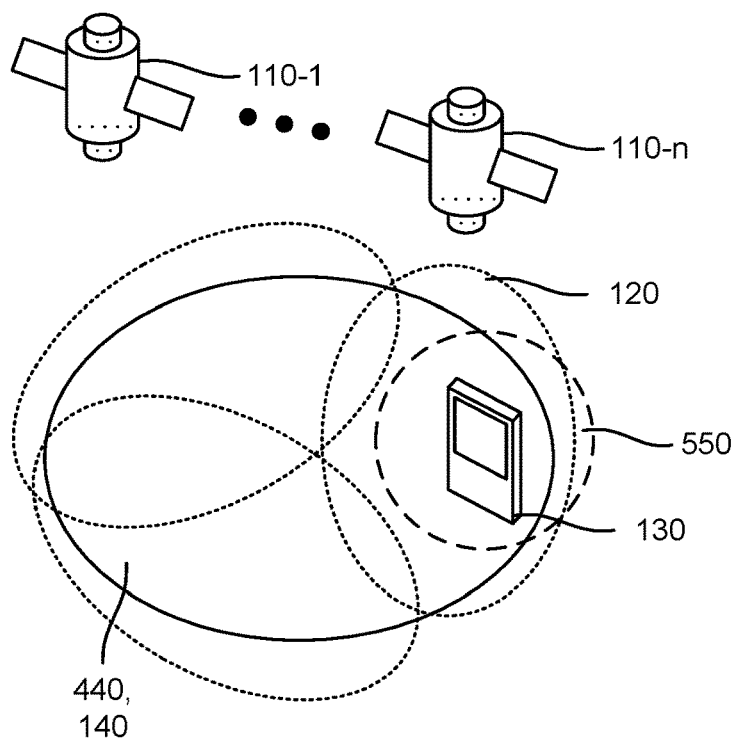
FIG. 5 illustrates an example of a user terminal tracking area being determined based on a last area of a user terminal, according to various aspects.

As indicated, determining the current region may also depend on the last area of the UT 130. In FIG. 5, it may be assumed that the last area 550 of the UT 130 has been determined. In particular, the last area 550 is illustrated as an area that surrounds the last location of the UT 130. That is, the last area 550 may be an area within which the UT 130 was last located. In an aspect, the last location of the UT 130 may be determined, and the last area 550 represents a margin of uncertainty when the last location is determined. The last area 550 is illustrated as a long-dashed circle in FIG. 5. However, the last area 550 may be of any shape.

The last area 550 may be determined in various ways. In one aspect, the UT 130 may acquire its location. For example, the UT 130 may be GNSS, GPS capable. As another example, the UT 130 may be capable of determining its location through measuring signals from terrestrial network base stations (e.g., eNB, gNB) and/or from non-terrestrial stations (e.g., UT 130 can use signals from multiple NTN satellites to get its location). In yet another example, a terrestrial network may determine the UT 130's location (e.g., through signals transmitted by the UT 130) and provide the location back to the UT 130.

The UT 130 may report its acquired location to the network 100 (e.g., to the coordinator 180 and/or to a satellite 110). For example, whenever the UT 130 exits a connected state (e.g., exits RRC_CONNECTED state), the UT 130 may send its location. The UT 130 may send such location reports more than once (e.g., periodically, on demand, based on triggering events, etc.). For example, when the UT 130 determines that it has traveled at least a threshold distance (more on this below) from its last reported location, the UT 130 may send its updated location to the network 100. In an aspect, the UT 130 may send the location reports in radio resource control (RRC) messages.

For each location report, the network 100 may determine an area that encompasses the reported location. Then the area determined to encompass most recently reported location may become the last area 550. Note that for a UT 130 that is of mobility type 0 (fixed mobility), the network 100 may acquire the UT's location during installation and/or activation process.

In another aspect, the last area 550 may be determined in cases where the UT 130 is unable to acquire its location and/or is unable to provide location reports. In such instances, the last area 550 may be determined based on most recent communication with the UT 130. For example, the last area 550 may be determined as a coverage area 120 of a satellite beam 115 that served the UT 130 when the UT 130 exited its previous connection state (e.g., RRC_CONNECTED, RRC_INACTIVE, RRC_IDLE, etc.).

As indicated above, the UT TA 440 may be determined based on the current region. In general, an NTN TA 140 (of the plurality of NTN TAs 140) covered by at least one satellite beam 115 whose coverage area 120 overlaps the current region at least in part may be determined to be the UT TA 440. For a UT 130 that is of mobility type 1, the last area 550 may be considered to be the current region such that the UT TA 440 may be determined based on the last area 550. The UT TA 440 may be determined to an NTN TA 140 that corresponds to at least one satellite beam 115 whose coverage area 120 overlaps the last area 550 at least in part. In other words, the UT TA 440 may be the NTN TA 140 that corresponds to a coverage area 120 of at least one satellite beam 115 that overlaps the last area 550 at least in part.

For example, it is seen in FIG. 5, that the NTN TA 140 is covered by three coverage areas 120 (corresponding satellite beams 115 are not shown so as to reduce clutter). One of the coverage areas 120 overlaps the last area 550 at least in part. Hence, this NTN TA 140 is determined to be the UT TA 440. In an aspect, determining the UT TA 440 based on the last area 550 may also be sufficient if the UT 130 is of mobility type 1.

In another aspect, when the UT 130 is of mobility type 0, the last area 550, the current location, and the current region may all reduce down to a specific location—the UT's installation location. This is because for mobility type 0, the UT's location is not expected to change from its installation location. Thus, while not specifically shown, the NTN TA 140 with the coverage area 120 that covers the UT's installation location can be determined to be the UT TA 440.

Figure 6:
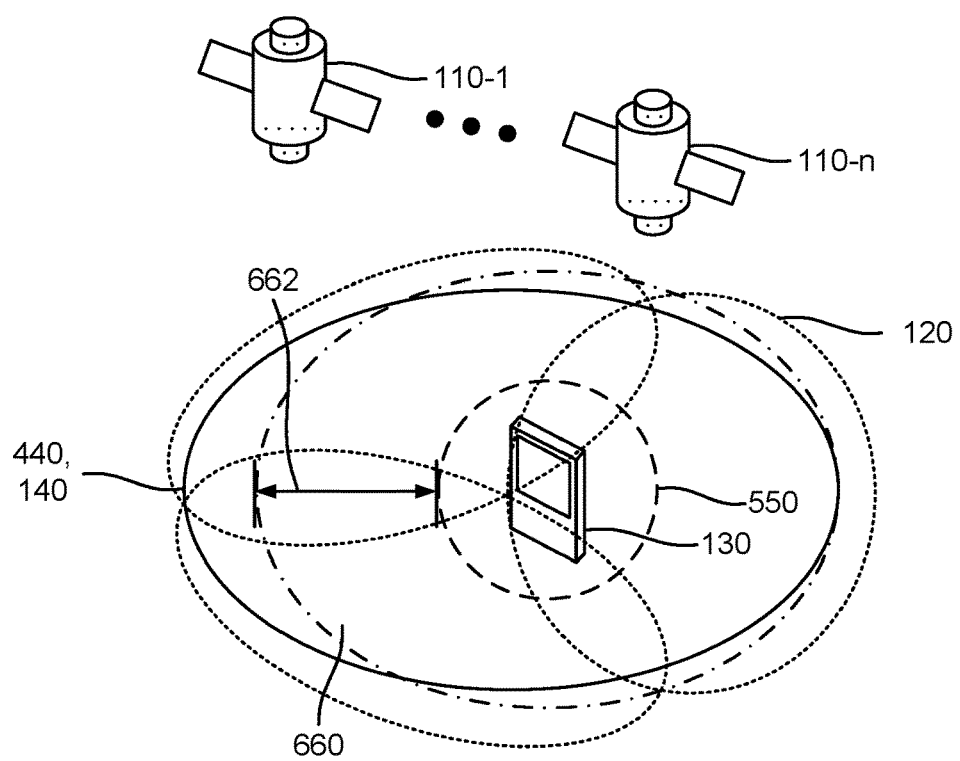
FIG. 6 illustrates an example of a user terminal tracking area being determined of a user terminal that reports its location, according to one or more aspects.

However, if the UT 130 is sufficiently mobile such that it could have traveled well outside of the last area 550 since the last area 550 was determined, then it is proposed to take into to account the distance that the UT 130 may have traveled. FIG. 6 illustrates determining the UT TA 440 of a UT 130 that reports its location to the network 100. Recall from above that for a location reporting UT 130, that UT 130 may report an updated location report whenever it has traveled at least a threshold distance from its previously reported location. In FIG. 6, it is assumed that the UT 130 is configured to report such location updates. That is, the threshold distance is the maximum distance that the UT 130 travels before updating its location through another location report.

As seen in FIG. 6, the threshold distance 662 may be determined, and a threshold region 660 (illustrated as dash-dot oval) may be determined based on the threshold distance 662. While the threshold region 660 is illustrated as an oval, the threshold region 660 may be of any shape. As indicated, the threshold distance 662 represents the maximum distance that the UT 130 could have traveled since its last location report. Therefore, it may not be necessary to account for areas that are beyond the threshold distance 662 from the last area 550.

In an aspect, the threshold region 660 may be determined so as to have at least the following two characteristics. A first characteristic is that at least a portion of the last area 550 is in an interior of the threshold region 660. In FIG. 6, the whole of the last area 550 is in the interior of the threshold region 660. A second characteristic is that a distance from the last area 550 to at least a portion of an edge of the threshold region 660 is based on the threshold distance 662. In FIG. 6, a distance between at least one edge portion of the last area 550 and at least one edge portion of the threshold region 660 is the threshold distance 662.

Having determined the threshold region 660, which may be considered to be the current region such that the UT TA 440 may be determined based on the threshold region 660. That is, the UT TA 440 may be determined to an NTN TA 140 covered by at least one satellite beam 115 whose coverage area 120 overlaps the threshold region 660 at least in part. To state it another way, the UT TA 440 may be the NTN TA 140 that corresponds to at least one satellite beam 115 whose coverage area 120 overlaps the threshold region 660 at least in part. It is seen in FIG. 6, that the NTN TA 140 is covered by three coverage areas 120 (corresponding satellite beams 115 are not shown so as to reduce clutter). All three coverage areas 120 overlap the threshold region 660, at least in part. Hence, this NTN TA 140 is determined to be the UT TA 440.

The threshold distance 662 may be a set threshold distance. Alternatively or in addition thereto, the threshold distance 662 may be determined based on one or a combination of factors. Such factors include mobility of the UT 130, a size a coverage area 120 of a satellite beam 115 that served the UT 130 when the network 100 received the last location, and density of satellite deployment of the network 100 among others.

Figure 7:
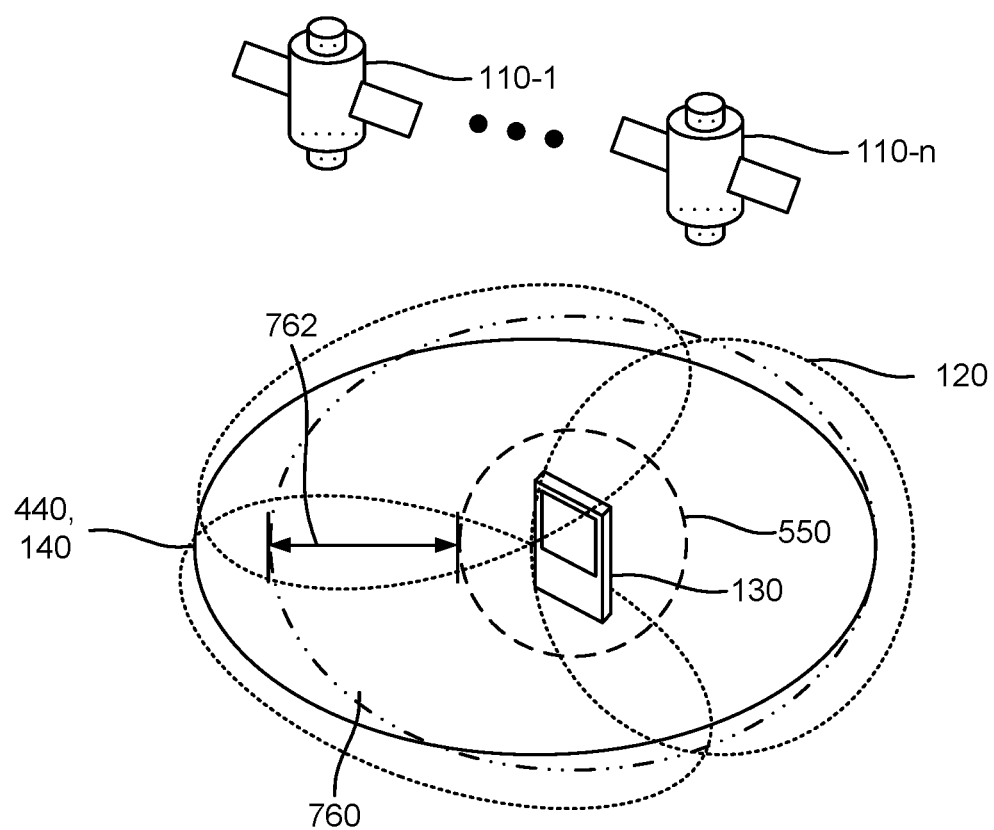
FIG. 7 illustrates an example of a user terminal tracking area being determined of a user terminal that does not report its location, according to various aspects.

FIG. 7 also illustrates determining the UT TA 440 of a UT 130 that is mobile. But in FIG. 7, it is assumed that the UT 130 does not report its location to the network. The UT 130 may be incapable of acquiring its location. Alternatively, the UT 130 may be capable, but is operating so that it does not report the location (e.g., the UT 130 maybe set in low power mode).

In this instance, the mobility of the UT 130 may be determined. Recall from above that the UT 130 may report its mobility. Thus one way to determine the mobility is to receive the mobility from the UT 130. Alternatively or in addition thereto, the network 100 may assume a default mobility. Further alternatively or in addition thereto, the network 100 may estimate the mobility based on past last area 550 determinations of the UT 130. Recall from above that the last area 550 may be determined even if the UT 130 is unable to or is unwilling to provide location reports.

As seen in FIG. 7, a movement distance 762 may be determined based on the mobility, and a movement region 760 (illustrated as dash-dot-dot oval) may be determined based on the movement distance 762. While the movement region 760 is illustrated as an oval, the movement region 760 may be of any shape. In this instance, the movement distance 762 may be said to be related to a distance the UT 130 could have traveled from the last area 550 since the last area 550 was determined. That is, it may not be necessary to account for areas that are beyond the movement distance 762 from the last area 550.

In an aspect, the movement region 760 may be determined so as to have at least the following two characteristics. A first characteristic is that at least a portion of the last area 550 is in an interior of the movement region 760. In FIG. 7, the whole of the last area 550 is in the interior of the movement region 760. A second characteristic is that a distance from the last area 550 to at least a portion of an edge of the movement region 760 is based on the movement distance 762. In FIG. 7, a distance between at least one edge portion of the last area 550 and at least one edge portion of the movement region 760 is the movement distance 762.

Having determined the movement region 760, which may be considered to be the current region such that the UT TA 440 may be determined based on the movement region 760. The UT TA 440 may be determined to an NTN TA 140 covered by at least one satellite beam 115 whose coverage area 120 overlaps the movement region 760 at least in part. In other words, the UT TA 440 may be the NTN TA 140 that corresponds to at least one satellite beam 115 whose coverage area 120 overlaps the movement region 760 at least in part. It is seen in FIG. 7, that the NTN TA 140 is covered by three coverage areas 120 (corresponding satellite beams 115 are not shown so as to reduce clutter). All three coverage areas 120 overlap the movement region 760, at least in part. Hence, this NTN TA 140 is determined to be the UT TA 440.

Figure 8:
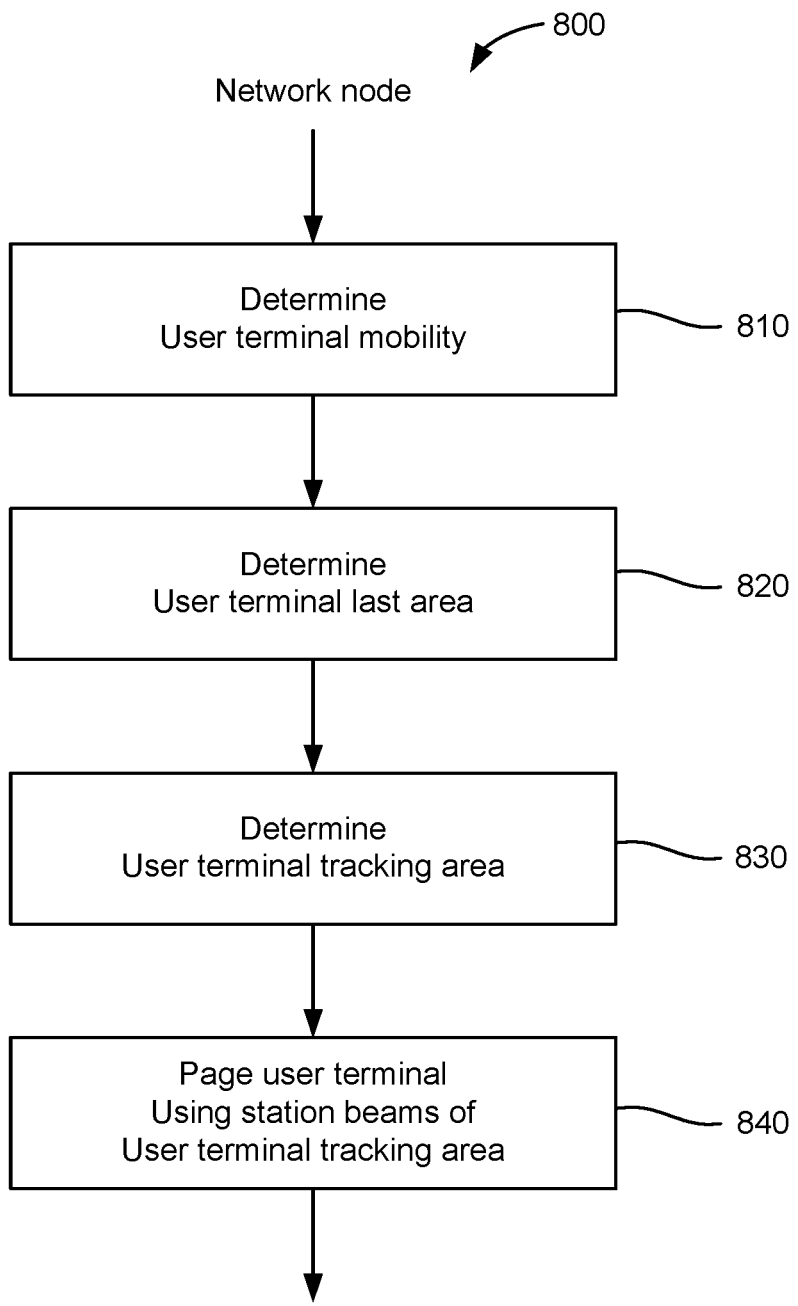
FIG. 8 illustrates a flow chart of an exemplary method performed by a network node of a non-terrestrial network for paging a user terminal, according to various aspects.

FIG. 8 illustrates an exemplary method 800 performed by a node of a non-terrestrial network (such as the NTN 100). In an aspect, the network node performing the method 800 may be the coordinator 180, 300. In this instance, the one or more stations 110 (e.g., satellites, HAPS) may facilitate communication between the coordinator 180, 300 and the UT 130. In another aspect, the network node performing the method 800 may be a station 110 or a combination of stations 110. In yet another aspect, the coordinator 180, 300 and one or more stations 110 may perform the method 800 together.

As indicated above, a satellite 110 (e.g., identified by a satellite ID) may correspond to one or more cells. Also, each cell (e.g., identified by a cell ID), may correspond to one or more satellite beams 115. Each satellite beam 115 (e.g., identified by a beam ID) may correspond to a coverage area 120. Also as indicated above, each NTA TA 140 of a plurality of NTN TAs 140 may be covered by one or more coverage areas 120 of the corresponding one or more satellite beams 115. This means that each NTN TA 140 may map to any combination of one or more satellites 110 and/or one or more cells and/or one or more satellite beams 115 and/or one or more coverage areas 120.

Note that the UT TA 440 may be defined as the NTN TA 140 in which the UT 130 is located. This implies that to page the UT 130, the NTN node may map the UT's location (or an estimation thereof) at the time of paging with one or more coverage areas 120, and then may use the corresponding satellite beams 115 to page the UT 130.

When the satellites 110 move in relation to the earth's surface, the UT TA 440 may be time variant. That is, the satellite(s)/cell(s)/beam(s)/coverage area(s) that correspond or otherwise map to the UT TA 440 in one time instance may different from the satellite(s)/cell(s)/beam(s)/coverage area(s) in another time instance. This is true regardless of whether the NTN TAs 140 are defined as fixed geographical zones or whether they are associated with groups of satellite(s)/cell(s)/beam(s)/coverage area(s).

When each NTN TA 140 is associated with a particular geographical region, this implies that the mapping between the UT TA 440 and the NTN TA 140 is time invariant. However, since the satellites 110 move in relation to earth surface, the satellite(s)/cell(s)/beam(s)/coverage area(s) that serve the NTN TA 140 are time variant. Thus, the mapping between the UT TA 440 and the satellite(s)/cell(s)/beam(s)/ coverage area(s) is time variant.

When each NTN TA 140 is associated with a particular combination of satellite(s)/cell(s)/beam(s)/coverage area(s), this implies that the mapping between the NTA TAs 140 and the satellite(s)/cell(s)/beam(s)/coverage area(s) is time invariant. However, since the satellites 110 move, the association between the UT TA 440 and the NTN TA 140 is time variant. Thus, the mapping between the UT TA 440 and the satellite(s)/cell(s)/beam(s)/coverage area(s) is again time variant.

In method 800, the time variant characteristic of the UT TA 440 is taken into account when determining the UT TA 440 for paging. At block 810, the network node (specifically, transceiver 304 and/or processor 301 of coordinator 300 and/or transceiver 218 and/or RX processor 270 of station 110) may receive a report of mobility from the UT 130. The mobility may be received as a mobility type of a plurality of mobility types. Each mobility type may correspond to a level or a range of mobility. For example, the mobility types may include fixed mobility, stationary mobility, low mobility, high mobility, etc. The mobility type may be stored at the network side (e.g., at the coordinator 180, 300; satellites 130), and recalled for use as desired or necessary.

Figure 9A:
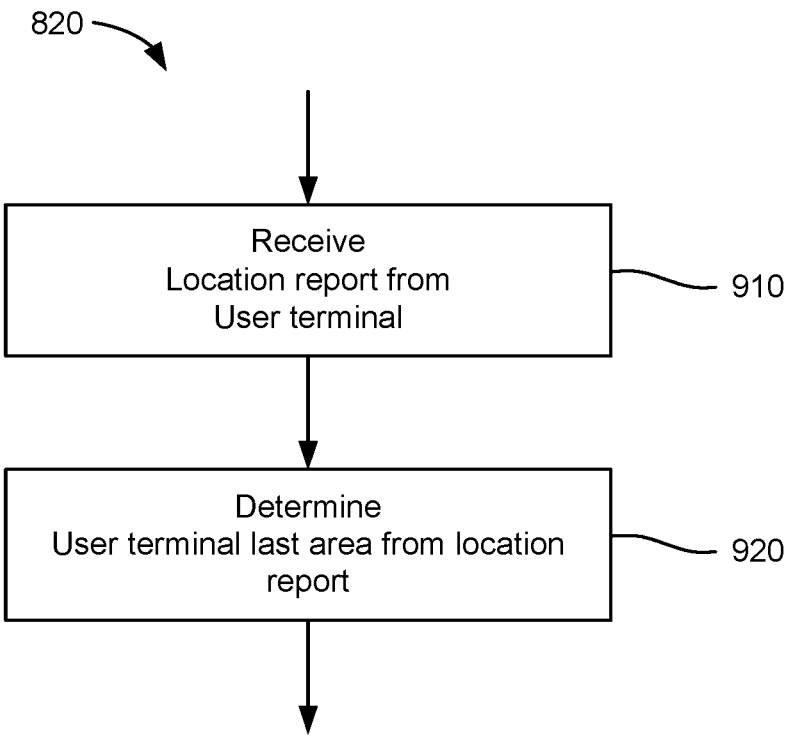
FIGS. 9A and 9B illustrate flow charts of exemplary processes performed by a network node of a non-terrestrial network for determining a last area of a user terminal, according to various aspects.

At block 820, the network node may determine the last area 550 of the UT 130. FIG. 9A illustrates an example process performed by the network node to implement block 820. In FIG. 9A, it is assumed that the UT 130 is capable of acquiring its location and reporting the acquired location. At block 910, the network node (specifically, transceiver 304 and/or processor 301 of coordinator 300 and/or transceiver 218 and/or RX processor 270 of station 110) may receive a location report from the UT 130. The location report may include a last location. In an aspect, the location report may be received in a radio resource control (RRC) message.

At block 920, the network node may (specifically, processor 301 of coordinator 300 and/or controller/processor 275 of station 110) determine the last area 550 from the location report. For example, the last area 550 may be determined as an area that encompasses the last location. The last area 550 may be of any shape.

Figure 9B:
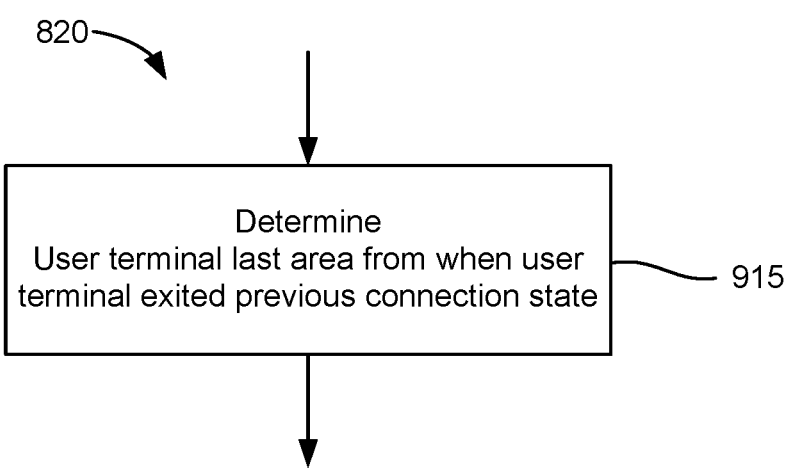

FIG. 9B illustrates another example process performed by the network node to implement block 820. In FIG. 9B, it is assumed that the UT 130 is incapable of or is unwilling to report its location. At block 915, the network node (specifically, processor 301 of coordinator 300 and/or controller/ processor 275 of station 110) may determine the last area 550 most recent communication with the UT 130. For example, the last area 550 may be determined as a coverage area 120 of a station beam 115 (e.g., satellite beam) that served the UT 130 when the UT 130 exited its previous connection state.

Figure 10:
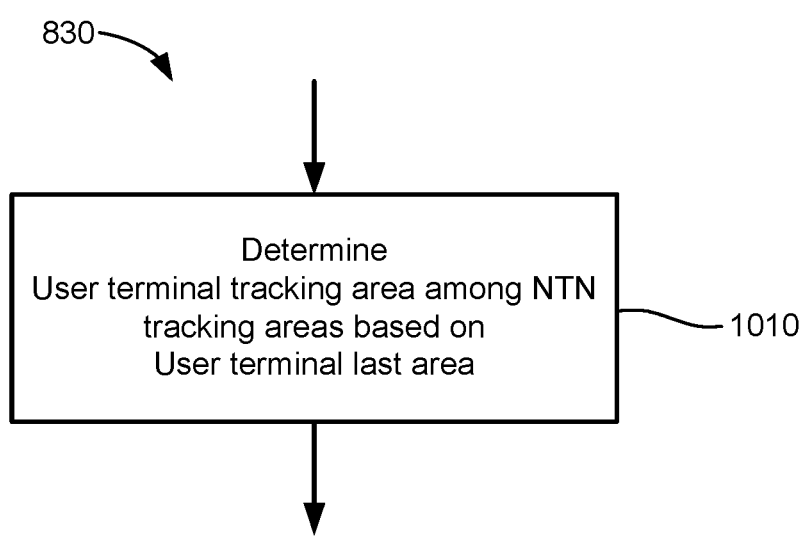
FIG. 10 illustrates a flow chart of an exemplary process performed by a network node of a non-terrestrial network for determining a user terminal tracking area, according to various aspects.

Referring back to FIG. 8, at block 830, the network node may determine the UT TA 440 of the UT 130. FIG. 10 illustrates an example process performed by the network node to implement block 830. In an aspect, the process illustrated in FIG. 10 may be viewed as a continuation of FIG. 9A, i.e., as determining the UT TA 440 based on the last area 550 that was determined from the UT 130 reporting its location. Alternatively, the process illustrated in FIG. 10 may be viewed as a continuation of FIG. 9B, i.e., as determining the UT TA 440 based on the last area 550 that was determined of the UT 130 unwilling or unable to report its location.

At block 1010, the network node (specifically, processor 301 of coordinator 300 and/or controller/processor 275 of station 110) may choose or otherwise determine the UT TA 440 among the plurality of NTN TAs 140 defined in the network 100 based on the last area 550. In particular, the NTN TA 140 that is covered by at least one station beam 115 whose coverage area 120 overlaps the last area 550 at least in part may be chosen as the UT TA 440. In other words, the UT TA 440 may be the NTN TA 140 that corresponds to at least one station beam 115 whose coverage area 120 overlaps the last area 550 at least in part. Block 1010 may be performed, for example, when the mobility of the UT 130 is low, i.e., is below a low mobility threshold (e.g., at or below mobility type 1). The flowcharts FIGS. 9A, 9B and 10 may correspond to the scenario illustrated in FIG. 5.

Figure 11A:
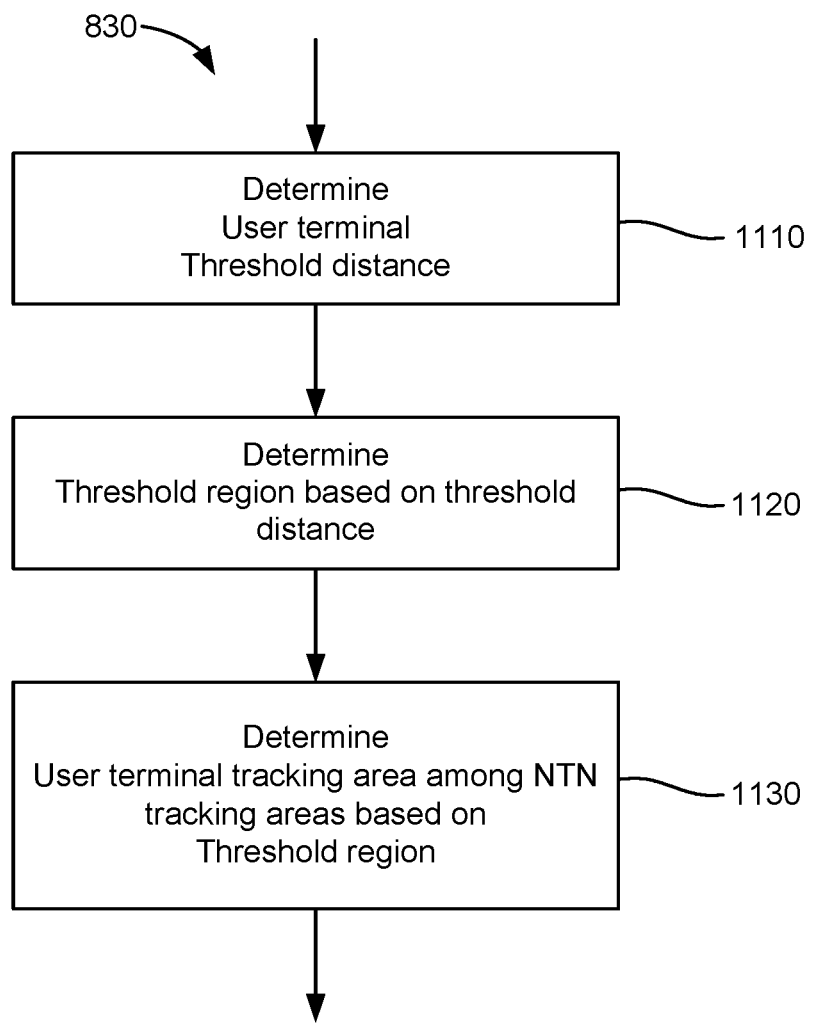
FIGS. 11A and 11B illustrate flow charts of another exemplary processes performed by a network node of a non-terrestrial network for determining a user terminal tracking area, according to various aspects.

FIG. 11A illustrates another example process performed by the network node to implement block 830. In an aspect, the process illustrated in FIG. 11A may be viewed as a continuation of FIG. 9A, i.e., as determining the UT TA 440 based on the last area 550 that was determined from the UT 130 reporting its location.

At block 1110, the network node (specifically, processor 301 of coordinator 300 and/or controller/processor 275 of station 110) may determine the threshold distance 662 of the UT 130. In an aspect, recall that for UTs 130 that report and update their locations, the threshold distance 662 may represent the maximum distance that the UT 130 travels in between location reporting occasions. The threshold distance 662 may be a set threshold distance. Alternatively, threshold distance 662 may be determined based on any one or more a size a coverage area 120 of a station beam 115 that served the UT 130 when the network 100 received the last location, mobility of the UT 130, and density of station deployment of the network 100 among others.

At block 1120, the network node (specifically, processor 301 of coordinator 300 and/or controller/processor 275 of station 110) may determine the threshold region 660 based on the threshold distance 662. The threshold region 660 may be of any shape. In an aspect, the threshold region 660 may be determined such that at least a portion of the last area 550 is in an interior of the threshold region 660. Alternatively or in addition thereto, the threshold region 660 may be determined such that a distance from the last area 550 to at least a portion of an edge of the threshold region 660 is based on the threshold distance 662.

At block 1130, the network node (specifically, processor 301 of coordinator 300 and/or controller/processor 275 of station 110) may choose or otherwise determine the UT TA 440 among the plurality of NTN TAs 140 defined in the network 100 based on the threshold region 660. For example, the NTN TA 140 that is covered by at least one station beam 115 whose coverage area 120 overlaps the threshold region 660 at least in part may be chosen as the UT TA 440. In other words, the UT TA 440 may be the NTN TA 140 that corresponds at least one satellite beam 115 whose coverage area 120 overlaps the threshold region 660 at least in part.

In an aspect, blocks 1110, 1120, 1130 may be performed for UTs 130 that report their locations, for example, when the mobility of the UT 130 is high, i.e., is below a low mobility threshold (e.g., higher than mobility type 1). In another aspect, blocks 1110, 1120, 1130 may be performed for location reporting UTs 130 regardless of the mobility. The flowcharts FIGS. 9A and 11A may correspond to the scenario illustrated in FIG. 6.

Figure 11B:
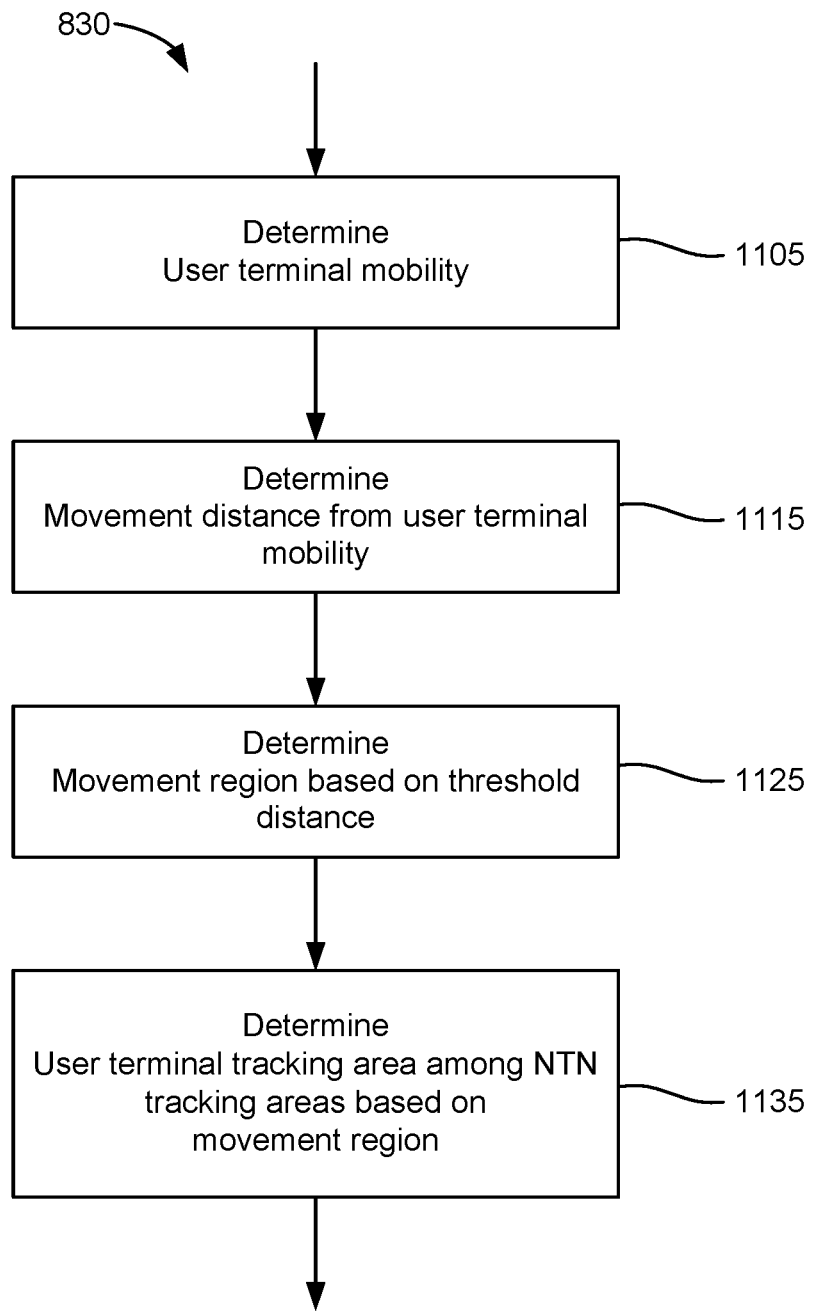

FIG. 11B illustrates yet another example process performed by the network node to implement block 830. In an aspect, the process illustrated in FIG. 11B may be viewed as a continuation of FIG. 9B, i.e., as determining the UT TA 440 for a UT 130 that does not report its location.

At block 1105, the network node (specifically, transceiver 304 and/or processor 301 of coordinator 300 and/or transceiver 218, RX processor 270, and/or controller/processor 275 of station 110) may determine the mobility of the UT 130. The mobility may be determined based on any one or more of receiving the mobility from the UT 130, assuming a default mobility, estimating the mobility based on past last area 550 determinations, etc.

At block 1115, the network node (specifically, processor 301 of coordinator 300 and/or controller/processor 275 of station 110) may determine the movement distance 762 based on the mobility. In an aspect, the movement distance 762 may represent a distance that the UT 130 could have traveled from the last area 550 since the last area 550 was determined.

At block 1125, the network node (specifically, processor 301 of coordinator 300 and/or controller/processor 275 of station 110) may determine the movement region 760 based on the movement distance 762. The movement region 760 may be of any shape. In an aspect, the movement region 760 may be determined such that at least a portion of the last area 550 is in an interior of the movement region 760. Alternatively or in addition thereto, the movement region 760 may be determined such that a distance from the last area 550 to at least a portion of an edge of the movement region 760 is based on the movement distance 762.

At block 1135, the network node (specifically, processor 301 of coordinator 300 and/or controller/processor 275 of station 110) may choose or otherwise determine the UT TA 440 among the plurality of NTN TAs 140 defined in the network 100 based on the movement region 760. For example, the NTN TA 140 that is covered by at least one station beam 115 whose coverage area 120 overlaps the movement region 760 at least in part may be chosen as the UT TA 440. In other words, the UT TA 440 may be the NTN TA 140 that corresponds to at least one satellite beam 115 whose coverage area 120 overlaps the movement region 760 at least in part.

In an aspect, blocks 1105, 1115, 1125, 1135 may be performed for UTs 130 that do not report their locations, for example, when the mobility of the UT 130 is high, i.e., is below a low mobility threshold (e.g., higher than mobility type 1). In another aspect, blocks 1105, 1115, 1125, 1135 may be performed for non-location reporting UTs 130 regardless of the mobility. The flowcharts FIGS. 9B and 11B may correspond to the scenario illustrated in FIG. 7.

Figure 12:
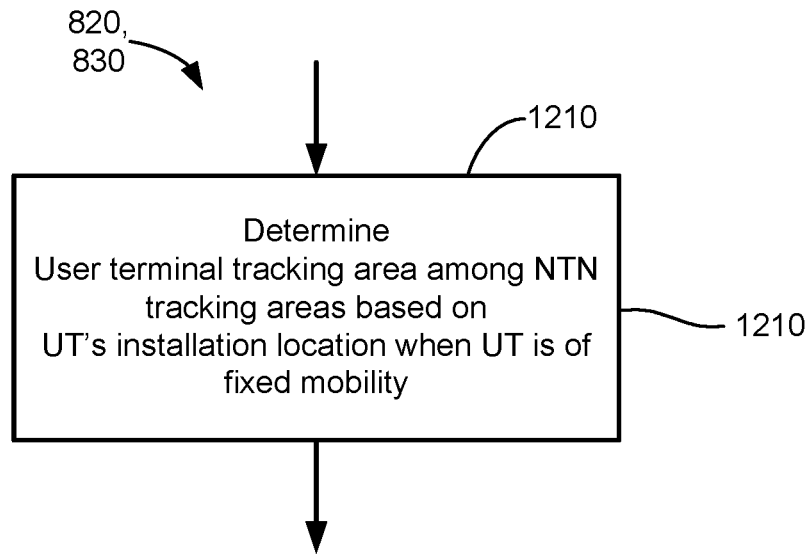
FIG. 12 illustrates a flow chart of an exemplary processes performed by a network node of a non-terrestrial network for determining a user terminal tracking area when a mobility of the user terminal is fixed mobility, according to various aspects.

FIG. 12 illustrates an example process performed by the network node to implement blocks 820 and 830. In this instance, the mobility of the UT 130 is assumed to be fixed mobility. That is, the location of the UT 130 is fixed to its installation location. Recall from above that a UT 130 such as a satellite receive dish are such that once installed, the location is more or less permanent. It is of course recognized that a dish may be moved, e.g., when the user moves to a new dwelling. However, at least while the UT 130 is in operation, its location will be the installation location. In such instances, the UT's location may be stored at the network side (e.g., at the coordinator 180, 300 and/or at the satellites 110) when the UT 130 is installed and/or activated. The UT's mobility may also be recorded at the network side.

Since the location of the UT 130 is not expected to change, then the last area 550, the current location, and the current region of the UT 130 all can be reduced to a specific location—to the installation location of the UT 130. Thus, in block 1210, the network node (specifically, processor 301 of coordinator 300 and/or controller/processor 275 of station 110) may determine, as the UT TA 440, an NTN TA 140 that is covered by at least one satellite beam 115 whose coverage area 120 covers the installation location of the UT 130. In other words, the UT TA 440 may be the NTN TA 140 that corresponds to at least one satellite beam 115 whose coverage area 120 covers the installation location. The network node may be configured to perform block 1210 when the mobility of the UT 130 recorded at the network side indicates that the mobility is fixed mobility.

Referring back to FIG. 8, when the UT TA 440 is determined for the UT 130, at block 840, the network node (specifically, transceiver 304 and/or processor 301 of coordinator 300 and/or transceiver 218 and/or TX processor 216 of station 110) may page the UT 130 through one or more station beams 115 corresponding to the UT TA 440. In other words, stations 110 with station beams 115 covering the UT TA 440 may be used to page the UT 130.

It is reiterated that the UT TA 440 is the NTN TA 140 that covers or otherwise overlaps the current region at least in part. Also recall that the current region is a region that the UT 130 is estimated to be in at the time of paging. This means that the UT TA 440 is one of the NTN TAs 140, and the paging is limited to using the satellite beams 115 within the UT T 440. This is desirable in that the network's resources in regions where the UT 130 is unlikely to be located will not be used to page the UT 130. Thus, in an aspect, some or all station beams (e.g., satellite beams) 115 of the UT TA 440 may be used to page the UT 130 regardless of the mobility of the UT 130 including fixed mobility.

But in an alternative aspect, when the mobility of the UT 130 is fixed mobility, there may be opportunities to reduce the use of network resources even further. In this instance, there is very little uncertainty about the location of the UT 130 at the time of paging since its location is fixed to the installation location. As such, it may be sufficient to simply use the satellite beams 115 with coverage areas 120 that cover the installation location.

Figure 13:
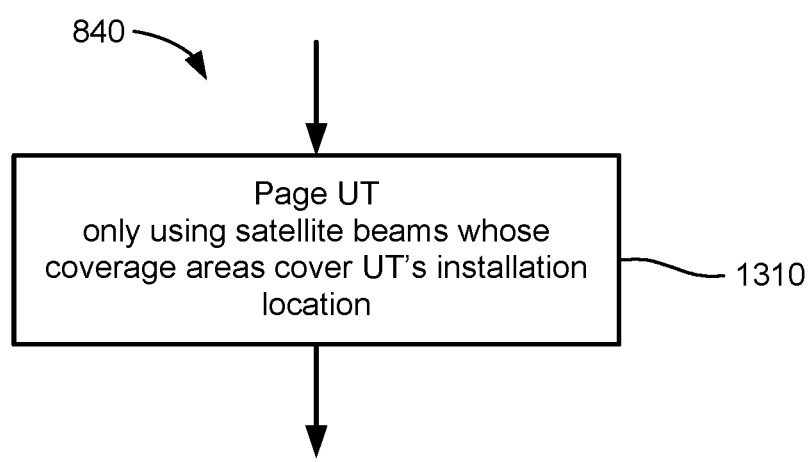
FIG. 13 illustrates a flow chart of an exemplary processes performed by a network node of a non-terrestrial network for paging a user terminal when a mobility of the user terminal is fixed mobility, according to various aspects.

FIG. 13 illustrates an example process performed by the network node to implement block 840 when the mobility of the UT 130 is fixed mobility. In block 1310, the network node (specifically, transceiver 304 and/or processor 301 of coordinator 300 and/or transceiver 218 and/or TX processor 216 of station 110) may page the UT 130 only using one or more satellite beams 115 whose coverage areas 120 cover the installation location. That is, in this alternative aspect, the satellite beams 115 of the UT TA 440 whose coverage areas 120 that do not cover the installation location need not be used. The network node may be configured to perform block 1310 when the mobility of the UT 130 recorded at the network side indicates that the mobility is fixed mobility.

Figure 14:
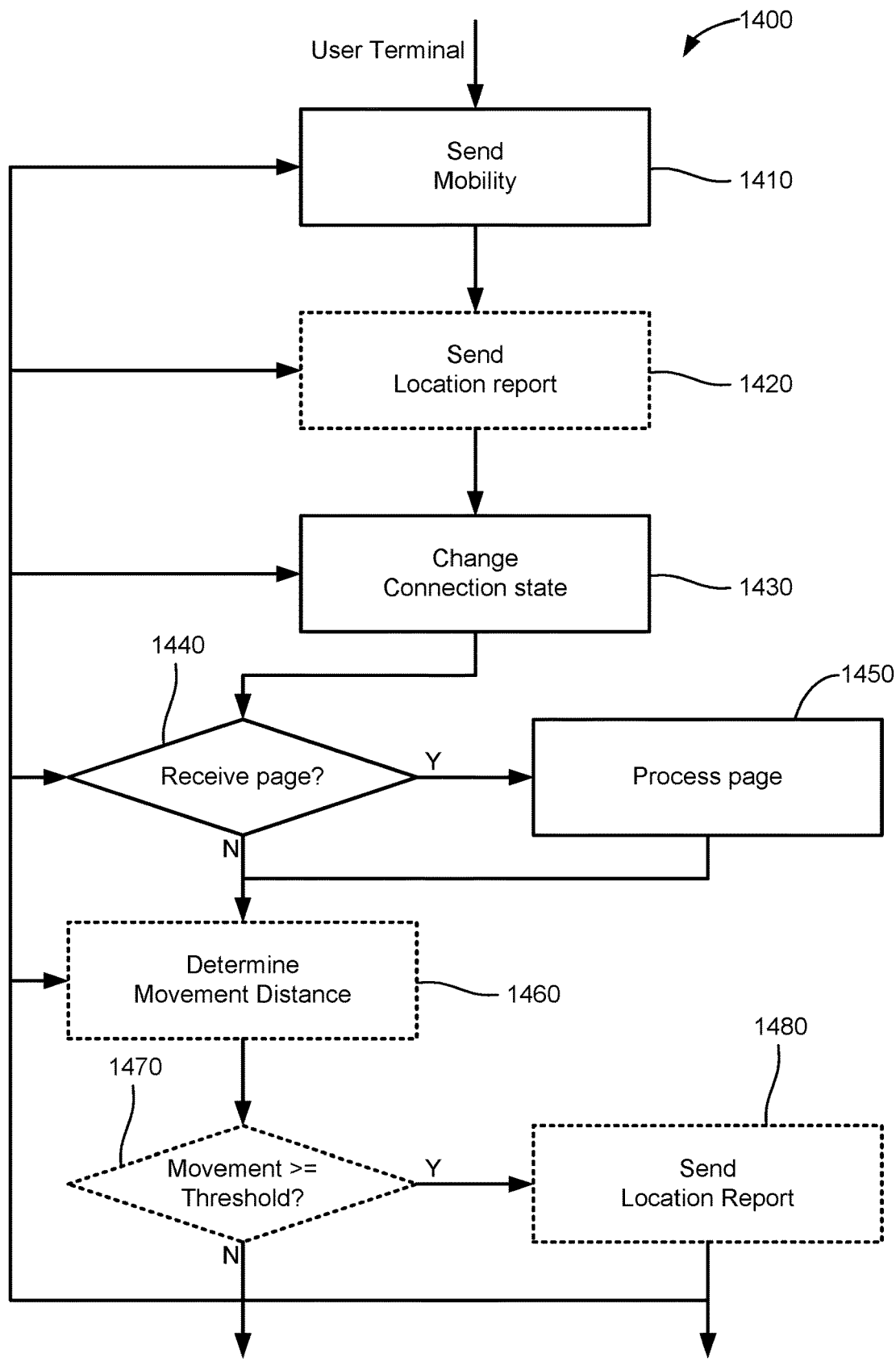
FIG. 14 illustrates a flow chart of an exemplary method performed by a user terminal for receiving pages from a non-terrestrial network, according to various aspects.

FIG. 14 illustrates an exemplary method 1400 performed by a user terminal (such as UT 130, paging receiver 250) for receiving pages from a non-terrestrial network (such as the NTN 100). At block 1410, the user terminal (specifically, transceiver 254 and/or TX processor 268) may send mobility of the user terminal to the network 100. The mobility may be reported as a mobility type of a plurality of mobility types. Each mobility type may correspond to a level or a range of mobility.

At block 1420, the user terminal (specifically, transceiver 254 and/or TX processor 268) may send a location report comprising its current location to the network 100. The location report may be sent as a radio resource control (RRC) message. Block 1420 is dashed to indicate that it is optional since that not all user terminals report their locations.

At block 1430, the user terminal (specifically, controller/processor 259) may change the connection state (e.g., RRC_CONNECTED, RRC_INACTIVE, RRC_IDLE, etc.) with the network 100. In this instance, if block 1420 is performed, then the reported location may be viewed as the last location of the user terminal prior to changing the connection state.

At block 1440, the user terminal (specifically, transceiver 254 and/or RX processor 256) may determine whether a page has been received. If so, then at block 1450, the user terminal (specifically, controller/processor 259) may process the page.

At block 1460, the user terminal (specifically, controller/processor 259) may determine a movement distance of the user terminal. In this instance, the movement distance may represent a distance between current location and previous location of the user terminal, where the previous location is the location of the user terminal previously reported to the network.

At block 1470, the user terminal (specifically, controller/processor 259) may determine whether or not the movement distance is equal to or greater than the threshold distance 662. If so, then at block 1480, the user terminal (specifically, transceiver 354 and/or TX processor 268) may send a location report, e.g., in RRC messages, to update the network 100 with the current location. Again, blocks 1460, 1470, 1480 are dashed to indicate that it is optional since that not all user terminals report their locations.

The method 1400 may end or may proceed back to any of blocks 1410, 1420, 1430, 1440, 1460 as shown to indicate that the user terminal may repeatedly send mobility and/or location reports and/or receive pages.

It should be noted that not all illustrated blocks of FIGS. 8-12 need be performed, i.e., some blocks may be optional. Also, the numerical references to the blocks in these figures should not be taken as requiring that the blocks should be performed in a certain order. Indeed, some blocks may be performed concurrently.

Figure 15:
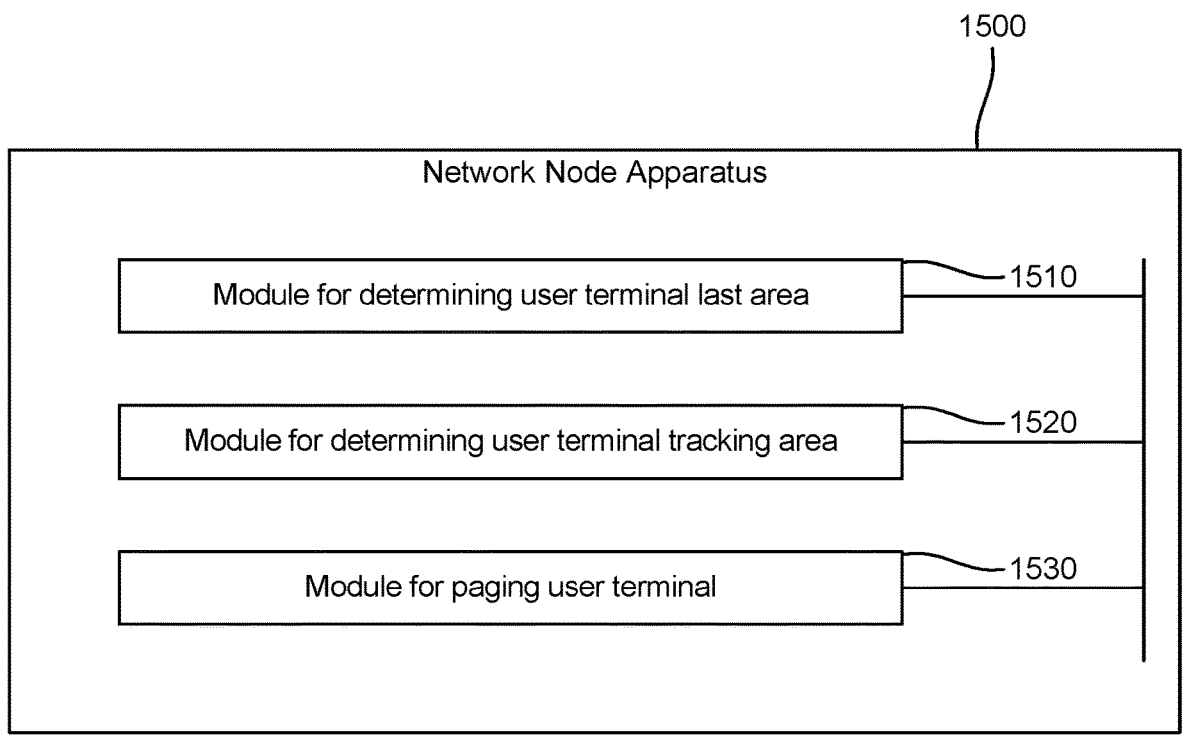
FIG. 15 illustrates a simplified block diagram of an example network node of a non-terrestrial network configured to page a user terminal, according to various aspects.
Figure 16:
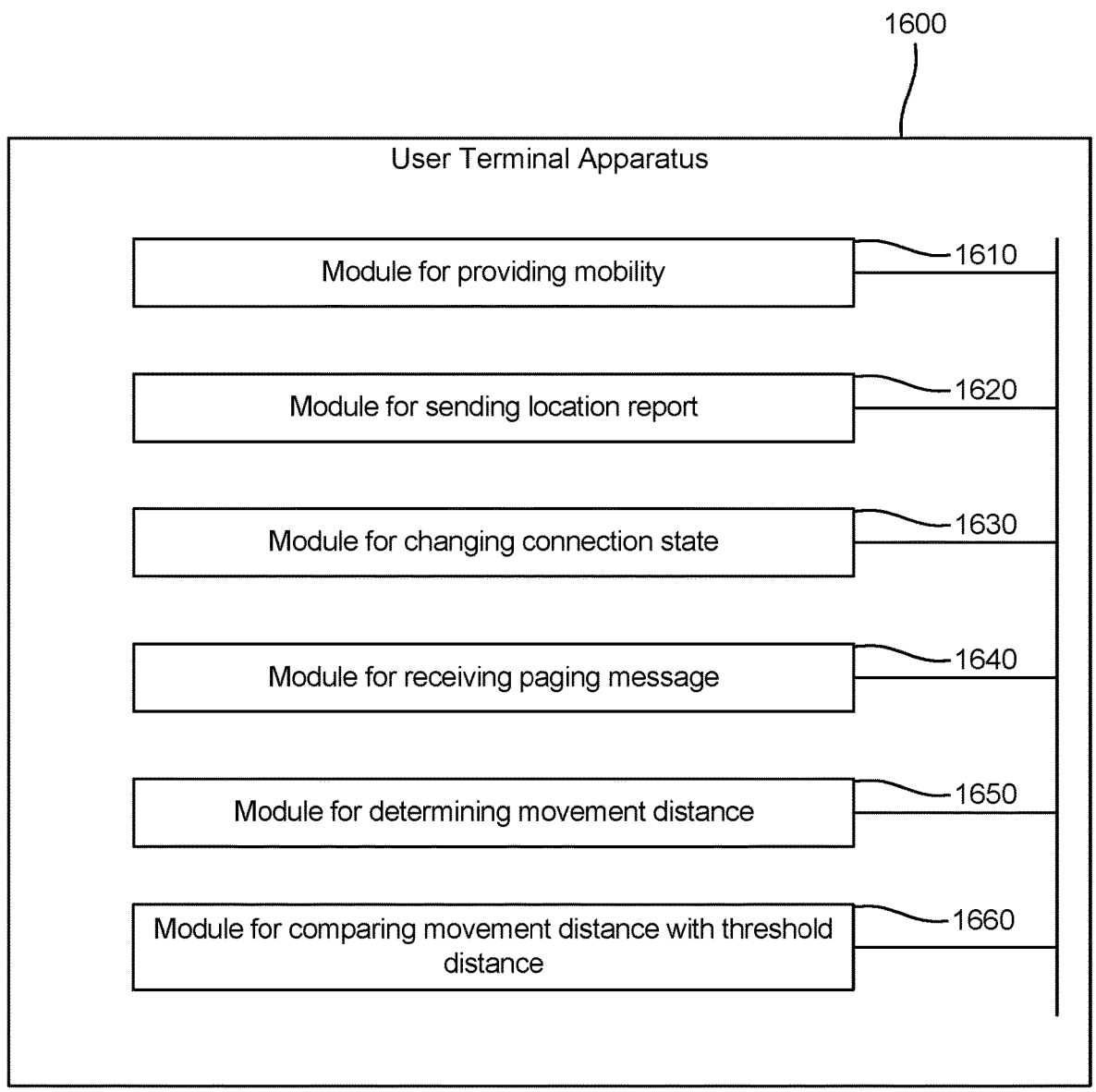
FIG. 16 illustrates a simplified block diagram of an user terminal configured to receive paging messages from a non-terrestrial network, according to various aspects.

FIG. 15 illustrates an example apparatus 1500 for implementing method 800 of FIGS. 8-11 represented as a series of interrelated functional modules in accordance with an aspect of the disclosure. In the illustrated example, the apparatus 1500 may include a module for determining a user terminal last area 1510, a module for determining a user terminal tracking area (UT TA) 1520, and a module for paging a user terminal 1530. The module for determining a user terminal last area 1510 may be configured to determine a last area 550 of a UT 130 (e.g., block 820 of FIG. 8). The module for determining a user terminal tracking area 1520 may be configured to determine a UT TA 440 based on the last area 550 (e.g., block 830 of FIG. 8). The module for paging a user terminal 1530 may be configured to page the UT 130 using one or more station beams 115 corresponding to the UT TA 440 (e.g., block 840).

FIG. 16 illustrates an example apparatus 1600 for implementing method 1400 represented as a series of interrelated functional modules in accordance with an aspect of the disclosure. In the illustrated example, the apparatus 1600 may include a module for providing mobility 1610, a module for sending location report 1620, a module for changing connection state 1630, a module for receiving paging message 1640, a module for determining movement distance 1650, and a module for comparing movement distance with threshold distance 1660.

The module for providing mobility 1610 may be configured to provide the NTN 100 with the mobility of the UT 130 (e.g., block 1410 of FIG. 14). The module for sending location report 1620 may be configured to send a location report comprising a last location of the UT 130 (e.g., blocks 1420 and 1480 of FIG. 14). The module for changing connection state 1630 may be configured to change a connection state of the UT 130 with the NTN (e.g., block 1430 of FIG. 14). The module for receiving paging message 1640 may be configured to receive a paging message from the NTN 100 (e.g., blocks 1440 and 1450 of FIG. 14). The module for determining movement distance 1650 may be configured to determine a movement distance of the UT 130 (e.g., block 1460 of FIG. 14). The module for comparing movement distance with threshold distance 1660 may be configured to determine whether the movement distance is greater than or equal to the threshold distance (e.g., block 1470 of FIG. 14).

The following provides an overview of examples of the present disclosure:

Example 1: A method of a network node of a non-terrestrial network (NTN), comprising: determining a last area of a user terminal (UT); determining a UT tracking area (TA) based on the last area, the UT TA being a non-terrestrial network tracking area (NTN TA) in which the UT is currently located, the UT TA being one of a plurality of NTN TAs; and paging the UT using one or more satellite beams corresponding to the UT TA.

Example 2: The method of example 1, wherein at least one NTN TA is associated with a group of one or more satellite beams such that the at least one NTN TA moves relative to earth surface in accordance with movements of one or more satellites corresponding to the one or more satellite beams.

Example 3: The method of any one of examples 1 through 2, wherein at least one NTN TA is a geographical zone on earth surface.

Example 4: The method of any one of examples 1 through 3, wherein determining the last area comprises: receiving a location report from the UT, the location report comprising a last location of the UT; and determining, as the last area, an area that encompasses the last location.

Example 5: The method of example 4, wherein determining the UT TA comprises determining, as the UT TA, an NTN TA that corresponds to at least one satellite beam whose coverage area overlaps the last area at least in part.

Example 6: The method of any one of examples 4 through 5, wherein determining the UT TA comprises: determining a threshold distance of the UT, the threshold distance being a maximum distance the UT travels before updating its location through another location report; determining a threshold region such that at least a portion of the last area is in an interior of the threshold region, and a distance from the last area to at least a portion of an edge of the threshold region is based on the threshold distance; and determining, as the UT TA, an NTN TA that corresponds to at least one satellite beam whose coverage area overlaps the threshold region at least in part.

Example 7: The method of example 6, wherein the threshold distance is determined based on any one or more of a size a coverage area of a satellite beam that served the UT when the network node received the last location, mobility of the UT, and density of satellite deployment of the NTN.

Example 8: The method of any one of examples 1 through 7, wherein determining the last area comprises determining, as the last area, a coverage area of a satellite beam that served the UT when the UT exited its previous connection state.

Example 9: The method of example 8, wherein determining the UT TA comprises determining, as the UT TA, an NTN TA that corresponds to at least one satellite beam whose coverage area overlaps the last area at least in part.

Example 10: The method of any one of examples 8 through 9, wherein determining the UT TA comprises: determining a mobility of the UT; determining a movement distance of the UT based on the mobility, the movement distance being related to a distance the UT could have traveled from the last area since the last area was determined; determining a movement region such that the last area is in an interior of the movement region, and a distance from the last area to at least a portion of an edge of the movement region is based on the movement distance; and determining, as the UT TA, an NTN TA that corresponds to at least one satellite beam whose coverage area overlaps the movement region at least in part.

Example 11: The method of example 10, wherein determining the mobility comprises: receiving the mobility from the UT, wherein the mobility is received as a mobility type, wherein the received mobility type is one of a plurality mobility types, each mobility type corresponding to a level of mobility.

Example 12: The method of example 11, wherein at least one of the plurality of mobility types is fixed mobility indicating that a location of the UT is fixed to its installation location.

Example 13: The method of any one of examples 1 through 12, wherein a mobility of the UT is fixed mobility indicating that a location of the UT is fixed to its installation location, and wherein determining the last area and determining the UT TA comprise: determining, as the UT TA, an NTN TA that corresponds to at least one satellite beam whose coverage area covers the installation location of the UT.

Example 14: The method of example 13, wherein paging the UT comprises: paging the UT only using one or more satellite beams corresponding to the coverage areas of the UT TA covering the installation location of the UT.

Example 15: A network node of a non-terrestrial network (NTN) comprising a processor, memory coupled with the processor, the processor and memory configured perform a method of any one of examples 1 through 14.

Example 16: A network node of a non-terrestrial network (NTN) comprising at least one means for performing a method of any one of examples 1 through 14.

Example 17: A non-transitory computer-readable medium storing code for a network node of a non-terrestrial network (NTN) comprising a processor, memory coupled with the processor, and instructions stored in the memory and executable by the processor to cause the network node to perform a method of any one of examples 1 through 14.

Example 18: A method of a user terminal (UT), comprising: changing a connection state of the UT with a non-terrestrial network (NTN); and receiving a paging message from the NTN subsequent to changing the connection state.

Example 19: The method of example 18, further comprising: sending a location report comprising a last location of the UT prior to changing the connection state of the UT.

Example 20: The method of example 19, further comprising: determining a movement distance which is a distance between current location and previous location of the UT, the previous location being the location of the UT previously reported to the NTN; and sending to the NTN another location report to update the location of the UT with the current location whenever the movement distance exceeds a threshold distance.

Example 21: The method of example 20, wherein the threshold distance is determined based on any one or more of a size a coverage area of a satellite beam that served the UT when the network node received the last location, mobility of the UT, and density of satellite deployment of the NTN.

Example 22: The method of any one of examples 20 through 21, wherein the location of the UT and one or more updates to the location of the UT are reported in a radio resource control (RRC) message to the NTN.

Example 23: The method of any one of examples 18 through 22, further comprising: providing to the NTN a mobility of the UT, wherein the mobility is provided as a mobility type, and wherein the provided mobility type is one of a plurality mobility types, each mobility type corresponding to a level of mobility.

Example 24: The method of example 23, wherein at least one of the plurality of mobility types is fixed mobility indicating that a location of the UT is fixed to its installation location.

Example 25: A user terminal (UT) comprising a processor, memory coupled with the processor, the processor and memory configured perform a method of any one of examples 18 through 24.

Example 26: A user terminal (UT) comprising at least one means for performing a method of any one of examples 18 through 24.

Example 27: A non-transitory computer-readable medium storing code for a user terminal (UT) comprising a processor, memory coupled with the processor, and instructions stored in the memory and executable by the processor to cause the network node to perform a method of any one of examples 18 through 24.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UT) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method performed by a network node of a non-terrestrial network (NTN), the method comprising:
    determining a last area of a user terminal (UT);
    determining a UT tracking area (TA) based on the last area and a mobility of the UT, the UT TA being a non-terrestrial network tracking area (NTN TA) in which the UT is currently located, the UT TA being one of a plurality of NTN TAs; and
    paging the UT using one or more satellite beams corresponding to the UT TA.

2. The method of claim 1, wherein at least one NTN TA is associated with a group of one or more satellite beams such that the at least one NTN TA moves relative to earth surface in accordance with movements of one or more satellites corresponding to the one or more satellite beams.

3. The method of claim 1, wherein at least one NTN TA is a geographical zone on earth surface.

4. The method of claim 1, wherein determining the last area comprises:
    receiving a location report from the UT, the location report comprising a last location of the UT; and
    determining, as the last area, an area that encompasses the last location.

5. The method of claim 4, wherein determining the UT TA comprises determining, as the UT TA, an NTN TA that corresponds to at least one satellite beam whose coverage area overlaps the last area at least in part.

6. The method of claim 4, wherein determining the UT TA comprises:
    determining a threshold distance of the UT, the threshold distance being a maximum distance the UT travels before updating its location through another location report;
    determining a threshold region such that at least a portion of the last area is in an interior of the threshold region, and a distance from the last area to at least a portion of an edge of the threshold region is based on the threshold distance; and
    determining, as the UT TA, an NTN TA that corresponds to at least one satellite beam whose coverage area overlaps the threshold region at least in part.

7. The method of claim 6, wherein the threshold distance is determined based on any one or more of a set distance, a size a coverage area of a satellite beam that served the UT when the network node received the last location, the mobility of the UT, and a density of satellite deployment of the NTN.

8. The method of claim 1, wherein determining the last area comprises determining, as the last area, a coverage area of a satellite beam that served the UT when the UT exited its previous connection state.

9. The method of claim 8, wherein determining the UT TA comprises determining, as the UT TA, an NTN TA that corresponds to at least one satellite beam whose coverage area overlaps the last area at least in part.

10. The method of claim 8, wherein determining the UT TA comprises:
    determining the mobility of the UT;
    determining a movement distance of the UT based on the mobility, the movement distance being related to a distance the UT could have traveled from the last area since the last area was determined;
    determining a movement region such that the last area is in an interior of the movement region, and a distance from the last area to at least a portion of an edge of the movement region is based on the movement distance; and
    determining, as the UT TA, an NTN TA that corresponds to at least one satellite beam whose coverage area overlaps the movement region at least in part.

11. The method of claim 10, wherein determining the mobility comprises:
    receiving the mobility from the UT,
    wherein the mobility is received as a mobility type,
    wherein the received mobility type is one of a plurality mobility types, each mobility type corresponding to a level of mobility.

12. The method of claim 11, wherein at least one of the plurality of mobility types is fixed mobility indicating that a location of the UT is fixed to its installation location.

13. The method of claim 1,
    wherein the mobility of the UT is fixed mobility indicating that a location of the UT is fixed to its installation location, and
    wherein determining the last area and determining the UT TA comprises determining, as the UT TA, an NTN TA that corresponds to at least one satellite beam whose coverage area covers the installation location of the UT.

14. The method of claim 13, wherein paging the UT comprises:
    paging the UT only using one or more satellite beams corresponding to the coverage areas of the UT TA covering the installation location of the UT.

15. A method of operating a user terminal (UT), the method comprising:
    sending a location report to a non-terrestrial network (NTN), the location report comprising a last location of the UT;
    changing a connection state of the UT with the NTN subsequent to sending the location report;
    receiving a paging message from the NTN subsequent to changing the connection state;
    determining a movement distance which is a distance between a current location and a previous location of the UT, the previous location being the location of the UT previously reported to the NTN; and
    sending to the NTN another location report to update the location of the UT with the current location whenever the movement distance exceeds a threshold distance.

16. The method of claim 15, wherein the threshold distance is determined based on any one or more of a set distance, a size a coverage area of a satellite beam that served the UT when the network node received the last location, a mobility of the UT, and a density of satellite deployment of the NTN.

17. The method of claim 15, wherein the location of the UT and one or more updates to the location of the UT are reported in a radio resource control (RRC) message to the NTN.

18. The method of claim 15, further comprising:
providing to the NTN a mobility of the UT,
wherein the mobility is provided as a mobility type, and
wherein the provided mobility type is one of a plurality mobility types, each mobility type corresponding to a level of mobility.

19. The method of claim 18, wherein at least one of the plurality of mobility types is fixed mobility indicating that a location of the UT is fixed to its installation location.

20. A network node of a non-terrestrial network (NTN), the network node comprising:
a memory and at least one processor coupled to the memory,
wherein the memory and the at least one processor are configured to:
determine a last area of a user terminal (UT);
determine a UT tracking area (TA) based on the last area and a mobility of the UT, the UT TA being a non-terrestrial network tracking area (NTN TA) in which the UT is currently located, the UT TA being one of a plurality of NTN TAs; and
page the UT using one or more satellite beams corresponding to the UT TA.

21. The network node of claim 20, wherein at least one NTN TA is a geographical zone on earth surface.

22. The network node of claim 20, wherein the network node also comprises a transceiver coupled to the at least one processor, and wherein in determining the last area and in determining the UT TA, the memory, the transceiver, and the at least one processor are configured to:
receive a location report from the UT, the location report comprising a last location of the UT;
determine, as the last area, an area that encompasses the last location; and
determine, as the UT TA, an NTN TA that corresponds to at least one satellite beam whose coverage area overlaps the last area at least in part.

23. The network node of claim 22, wherein in determining the UT TA, the memory and the at least one processor are configured to:
determine a threshold distance of the UT, the threshold distance being a maximum distance the UT travels before updating its location through another location report;
determine a threshold region such that at least a portion of the last area is in an interior of the threshold region, and a distance from the last area to at least a portion of an edge of the threshold region is based on the threshold distance; and
determine, as the UT TA, an NTN TA that corresponds to at least one satellite beam whose coverage area overlaps the threshold region at least in part.

24. The network node of claim 20, wherein in determining the last area and in determining the UT TA, the memory and the at least one processor are configured to:
determine, as the last area, a coverage area of a satellite beam that served the UT when the UT exited its previous connection state; and
determine, as the UT TA, an NTN TA that corresponds to at least one satellite beam whose coverage area overlaps the last area at least in part.

25. The network node of claim 20,
wherein the mobility of the UT is fixed mobility indicating that a location of the UT is fixed to its installation location, and
wherein in determining the last area and in determining the UT TA, the memory and the at least one processor are configured to determine, as the UT TA, an NTN TA that corresponds to at least one satellite beam whose coverage area covers the installation location of the UT.

26. The network node of claim 25, wherein the network node also comprises a transceiver coupled to the at least one processor, and wherein in paging the UT, the memory, the transceiver, and the at least one processor are configured to:
page the UT only using one or more satellite beams corresponding to the coverage areas of the UT TA covering the installation location of the UT.

27. The network node of claim 20, wherein in determining the UT TA, the memory and the at least one processor are configured to:
determine the mobility of the UT;
determine a movement distance of the UT based on the mobility, the movement distance being related to a distance the UT could have traveled from the last area since the last area was determined;
determine a movement region such that the last area is in an interior of the movement region, and a distance from the last area to at least a portion of an edge of the movement region is based on the movement distance; and
determine, as the UT TA, an NTN TA that corresponds to at least one satellite beam whose coverage area overlaps the movement region at least in part.

28. A user terminal (UT), comprising:
a memory and at least one processor coupled to the memory,
wherein the memory and the at least one processor are configured to:
send a location report to a non-terrestrial network (NTN), the location report comprising a last location of the UT;
change a connection state of the UT with the NTN subsequent to sending the location report;
receive a paging message from the NTN subsequent to changing the connection state;
determine a movement distance which is a distance between a current location and a previous location of the UT, the previous location being the location of the UT previously reported to the NTN; and
send to the NTN another location report to update the location of the UT with the current location whenever the movement distance exceeds a threshold distance.

29. The UT of claim 28, wherein the UT network node also comprises a transceiver coupled to the at least one processor, and wherein the memory, the transceiver, and the at least one processor are configured to:
provide to the NTN a mobility of the UT,
wherein the mobility is provided as a mobility type,
wherein the provided mobility type is one of a plurality mobility types, each mobility type corresponding to a level of mobility, and
wherein at least one of the plurality of mobility types is fixed mobility indicating that a location of the UT is fixed to its installation location.

30. The UT of claim 28, wherein the threshold distance is determined based on any one or more of a set distance, a size a coverage area of a satellite beam that served the UT when the network node received the last location, a mobility of the UT, and a density of satellite deployment of the NTN.

\* \* \* \* \*